US012118284B2

(12) United States Patent
Fox et al.

(10) Patent No.: US 12,118,284 B2
(45) Date of Patent: *Oct. 15, 2024

(54) VERIFYING INTEGRITY OF CONTROLLER SOFTWARE UPDATES

(71) Applicant: Aurora Labs Ltd., Tel Aviv (IL)

(72) Inventors: Zohar Fox, Tel Aviv (IL); Carmit Sahar, Tel Aviv (IL)

(73) Assignee: Aurora Labs Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/327,472

(22) Filed: Jun. 1, 2023

(65) Prior Publication Data
US 2023/0306170 A1  Sep. 28, 2023

Related U.S. Application Data

(63) Continuation of application No. 17/656,127, filed on Mar. 23, 2022, now Pat. No. 11,709,981, which is a
(Continued)

(51) Int. Cl.
*G06F 30/33* (2020.01)
*G06F 8/34* (2018.01)
(Continued)

(52) U.S. Cl.
CPC ............... *G06F 30/33* (2020.01); *G06F 8/34* (2013.01); *G06F 8/65* (2013.01); *G06F 8/71* (2013.01);
(Continued)

(58) Field of Classification Search
CPC ............... G06N 11/3692; G06N 20/00; G06F 16/9014; G06F 8/34; G06F 8/65;
(Continued)

(56) References Cited

U.S. PATENT DOCUMENTS 7,430,670 B1  9/2008  Horning et al.
8,006,233 B2  8/2011  Centonze et al.
(Continued)

FOREIGN PATENT DOCUMENTS

JP           169702 A    6/2002

OTHER PUBLICATIONS

Pre-Appeal Examination Report for Japanese Patent Application No. 2021-557227 (Appeal No. 2023-011611) Oct. 20, 2023 (5 pages).
(Continued)

*Primary Examiner* — Hosuk Song
(74) *Attorney, Agent, or Firm* — Finnegan, Henderson, Farabow, Garrett & Dunner LLP

(57) ABSTRACT

Disclosed herein are techniques for analyzing control-flow integrity based on functional line-of-code behavior and relation models. Techniques include receiving data based on runtime operations of a controller; constructing a line-of-code behavior and relation model representing execution of functions on the controller based on the received data; constructing, based on the line-of-code behavioral and relation model, a dynamic control flow integrity model configured for the controller to enforce in real-time; and deploying the dynamic control flow integrity model to the controller.

20 Claims, 17 Drawing Sheets

Related U.S. Application Data continuation of application No. 17/350,011, filed on Jun. 17, 2021, now Pat. No. 11,314,633, which is a continuation of application No. 17/094,993, filed on Nov. 11, 2020, now Pat. No. 11,074,168, which is a continuation of application No. 16/828,800, filed on Mar. 24, 2020, now Pat. No. 10,878,082.

(60) Provisional application No. 62/823,131, filed on Mar. 25, 2019.

(51) Int. Cl.
| | | |
|---|---|---|
| *G06F 8/65* | (2018.01) | |
| *G06F 8/71* | (2018.01) | |
| *G06F 8/75* | (2018.01) | |
| *G06F 11/36* | (2006.01) | |
| *G06F 16/901* | (2019.01) | |
| *G06F 17/18* | (2006.01) | |
| *G06F 18/24* | (2023.01) | |
| *G06F 21/52* | (2013.01) | |
| *G06F 21/56* | (2013.01) | |
| *G06F 21/57* | (2013.01) | |
| *G06F 21/62* | (2013.01) | |
| *G06N 20/00* | (2019.01) | |
| *G06F 30/15* | (2020.01) | |
| *G10H 1/00* | (2006.01) | |

(52) U.S. Cl.
CPC ............ *G06F 8/75* (2013.01); *G06F 11/3604* (2013.01); *G06F 11/3612* (2013.01); *G06F 11/362* (2013.01); *G06F 11/3692* (2013.01); *G06F 16/9014* (2019.01); *G06F 17/18* (2013.01); *G06F 18/24* (2023.01); *G06F 21/52* (2013.01); *G06F 21/563* (2013.01); *G06F 21/57* (2013.01); *G06F 21/6218* (2013.01); *G06N 20/00* (2019.01); *G06F 30/15* (2020.01); *G10H 1/0058* (2013.01)

(58) Field of Classification Search
CPC .......... G06F 8/71; G06F 8/75; G06F 11/3604; G06F 11/3612; G06F 17/18; G06F 21/52; G06F 21/57; G06F 21/6218; G06F 30/33; G06F 11/362; G06K 9/6267
See application file for complete search history.

(56) References Cited

U.S. PATENT DOCUMENTS

| | | | |
|---|---|---|---|
| 8,046,834 B2 | 10/2011 | Flynn et al. | |
| 8,161,463 B2 | 4/2012 | Johnson et al. | |
| 8,561,183 B2 | 10/2013 | Muth et al. | |
| 8,683,583 B2 | 3/2014 | Miller et al. | |
| 8,959,632 B2 | 2/2015 | Chen et al. | |
| 8,984,478 B2 | 3/2015 | Epstein | |
| 9,063,721 B2 | 6/2015 | Ghose | |
| 9,336,128 B2 | 5/2016 | Li et al. | |
| 9,390,261 B2 | 7/2016 | Costa et al. | |
| 9,569,612 B2 | 2/2017 | Wilkerson et al. | |
| 9,767,284 B2 | 9/2017 | Ghose | |
| 10,558,808 B2 | 2/2020 | Godas-Lopez | |
| 10,878,082 B2 | 12/2020 | Fox et al. | |
| 10,884,898 B2 | 1/2021 | Fox et al. | |
| 10,896,038 B2 | 1/2021 | Fox et al. | |
| 11,010,495 B1 | 5/2021 | McArdle et al. | |
| 11,023,574 B2 | 6/2021 | Harel et al. | |
| 11,074,168 B2 | 7/2021 | Fox et al. | |
| 11,314,633 B2 | 4/2022 | Fox et al. | |
| 11,562,071 B2 * | 1/2023 | Jung | G06F 11/3037 |
| 11,586,725 B2 * | 2/2023 | Slik | G06F 21/577 |
| 11,615,181 B2 * | 3/2023 | Slik | G06F 21/54 |
| | | | 726/22 |
| 11,709,981 B2 * | 7/2023 | Fox | G06F 18/24 |
| | | | 726/22 |
| 11,748,457 B2 * | 9/2023 | Boling | G06F 21/121 |
| | | | 726/1 |
| 11,789,724 B2 * | 10/2023 | Ferrara | G06F 8/65 |
| | | | 717/124 |
| 2011/0191757 A1 | 8/2011 | Mody et al. | |
| 2014/0181796 A1 | 6/2014 | Singh et al. | |
| 2016/0028322 A1 | 9/2016 | Rogers et al. | |
| 2019/0089720 A1 | 3/2019 | Aditharn et al. | |

OTHER PUBLICATIONS

Office Action issued in Japanese Patent Application No. 2021-557227 dated Nov. 4, 2022 (7 pages).

Blake Anderson et al. "Automating Reverse Engineering with Machine Learning Techniques", Artificial Intelligent and Security Workshop, ACM, Nov. 7, 2014, pp. 103-112, Retrieved on Mar. 27, 2020. Retrieved from the Internet. URL: <https://dl.acm.ora/doi/pdf/10.1145/2666652.2666665>.

Final Office Action issued in Japanese Patent Application No. 2021-557227 dated Mar. 6, 2023 (6 pages).

Notice of Reasons for Rejection for Japanese Patent Application No. 2021-557227 (Appeal No. 2023-011611) issued Jan. 17, 2024 (24 pages).

Penultimate Official Action in Japanese Patent Application No. 2021-557227 (Appeal No. 2023-011611) dated Apr. 30, 2024 (8 pages).

\* cited by examiner

VERIFYING INTEGRITY OF CONTROLLER SOFTWARE UPDATES

CROSS-REFERENCE TO RELATED APPLICATIONS

This application is a continuation of U.S. patent application Ser. No. 17/656,127, filed on Mar. 23, 2022, which is a continuation of U.S. patent application Ser. No. 17/350,011, filed on Jun. 17, 2021, which issued as U.S. Pat. No. 11,314,633 on Apr. 26, 2022, which is a continuation of U.S. patent application Ser. No. 17/094,993, filed on Nov. 11, 2020, which issued as U.S. Pat. No. 11,074,168 on Jul. 27, 2021, which is a continuation of U.S. patent application Ser. No. 16/828,800, filed on Mar. 24, 2020, which issued as U.S. Pat. No. 10,878,082 on Dec. 29, 2020, which claims priority to U.S. Provisional Patent App. No. 62/823,131, filed on Mar. 25, 2019. The disclosures of the above-referenced applications are incorporated herein by reference in their entireties.

TECHNICAL FIELD

The subject matter described herein generally relates to techniques for providing analysis and security to vehicle software and systems, as well as to various other types of Internet-of-Things (IoT) or network-connected systems that utilize controllers such as electronic control units (ECUs) or other controllers. For example, certain disclosed embodiments are directed to generating and signing line-of-code behavior and relation models. These techniques may include proving a status of software functionality change following a change to code. Some techniques may involve identifying software interdependencies through line-of-code behavior and relation models, verifying a software malfunction source among disparate code sources, and/or identifying software dependencies through line-of-code behavior and relation models. Other techniques may use line-of-code behavior and relation models to anticipate the impact of hardware changes. Further, some techniques may relate to verifying the integrity of controller software updates or providing for dynamic control flow integrity, through line-of-code behavior and relation models. As yet another example, some techniques may provide for dynamic visualization of code execution through line-of-code behavior and relation models.

BACKGROUND

Modern vehicles and other Internet of Things (IoT) systems often utilize many different controllers, which may need software changes from time to time. These software changes present many challenges. For example, to accept a software change over the air in conventional systems, a controller may have a communication channel that may be vulnerable to attack, such as through the introduction of malicious software files. In some scenarios, such vulnerability may be amplified by a lack of authentication of a software change (e.g., update, upgrade, patch, fix, recalibration, configuration management, etc.) at a device, such as at a controller. As another example, software developers may have difficulty in determining the functional effects caused by code changes, which may extend beyond a single component to other components and even entire systems. This may lead to unintended changes in a system, which in some cases may cripple functionality or even put a user in danger (for example, where a critical component in a vehicle is compromised). In many conventional settings, it may prove resource-intensive (if even possible) to pinpoint differences in functional effects between pieces of software, as well as to determine propagating effects of such differences. Moreover, confirming whether a software update preserves functional equivalence may be difficult to accomplish through conventional means, and may require lengthy processes using large amounts of data and bandwidth to make such confirmations. In many cases, current methods may provide developers with only a cursory understanding of functional impacts, or with line-of-code focused displays that fail to emphasize important functional information, making it a time and resource intensive process for a user to appreciate possible functional changes that may result from a change in code.

Conventional software analysis and security techniques are not currently equipped to handle these issues. For example, they lack adequate techniques for determining functional changes caused by new code, determining far-reaching impacts of functional changes, and ensuring functional consistency while preventing installation of functionally disruptive, unauthorized, and/or malicious software updates. Moreover, many current methods also fail to inform software developers of functional changes, regardless of their degree of disruptiveness.

In view of the technical deficiencies of current systems, there is a need for improved systems and methods for providing comprehensive security protections for controllers and systems. The techniques discussed below offer many technological improvements in security, efficiency, verifiability, and usability. For example, according to some techniques, code for a controller may be functionally analyzed and a line-of-code behavior and relation model may be generated. A signature operation may be performed on the line-of-code behavior and relation model, which may allow for rapid assessment of the line-of-code behavior and relation model relative to code or another model, without the need to scrutinize the entire model.

Related advantages may result from disclosed methods involving the functional differential comparison of two line-of-code behavior and relation models. Such a comparison may result in a status and/or determined degree of functional equivalence. This information may be used by devices, systems, and/or users to make decisions regarding software changes.

Line-of-code behavior and relation models as described herein may also allow for the detection of software interdependencies. For example, according to some disclosed techniques, functional line-of-code behavior and relation models may be analyzed, such as in conjunction with a possible software update, to identify interdependencies between different parts of code on the same controller.

As yet another advantage, disclosed techniques permit the identification of code or a device impacted by a potential software change, as well as an associated source. Using this identification, notifications may be sent to an associated source to ensure faster system or device healing.

Disclosed embodiments also relate to anticipating impacts of hardware changes. For example, a new piece of hardware may prompt an analysis process that leverages line-of-code behavior and relation models to determine a status of functional equivalence for the new piece of hardware. Based on the determined status, other responsive actions may be used to allow for more seamless implementation of the hardware into a system.

As with identifying software interdependencies, identifying software dependencies may also be achieved with the disclosed techniques. For example, multiple line-of-code behavior and relation models may be used to follow the impact of code changes throughout a system, allowing for early identification of unintended consequences within a system, and for the safe deployment of new software.

Disclosed embodiments also relate to verifying the integrity of controller software updates. For example, a line-of-code behavior and relation model and/or signature value may be used by a controller to confirm that a received update is legitimate and appropriate for execution. In some cases, a controller may only receive a signature value and compute its own line-of-code behavior and relation model and signature value, reducing strain on over-the-air bandwidth while still allowing the controller to ensure that a received software change will not interfere with its operations.

Further, some disclosed techniques allow for dynamic control flow integration using line-of-code behavior and relation models. For example, a line-of-code behavior and relation model may be based on runtime operations of a controller, and also used to construct a dynamic control flow integrity model, which may be deployed to a controller. In this manner, functional analysis of runtime operations may be used to provide for continued secure operation of a controller.

Moreover, some disclosed techniques provide for improved visualization of functional changes within a system or device by constructing a line-of-code behavior and relation model. For example, visual depictions of line-of-code behavior and relation models may be displayed and may dynamically change based on user interaction, code changes, device changes, and the like. Such depictions may condense information that would otherwise be time and resource intensive to analyze.

SUMMARY

Some disclosed embodiments describe non-transitory computer readable media, systems, and methods for using line-of-code behavior and relation models. For example, in an exemplary embodiment, a non-transitory computer readable medium may include instructions that, when executed by at least one processor, cause the at least one processor to perform operations for generating and signing line-of-code behavior and relation models. The operations may comprise identifying executable code for a controller; performing a functional analysis of the executable code to determine a plurality of functions associated with the executable code and a plurality of relationships between the plurality of functions; generating, based on the determined plurality of functions and plurality of relationships, a line-of-code behavior and relation model for the executable code; performing a signature operation on the generated line-of-code behavior and relation model to produce a unique signature value associated with at least one of: the line-of-code behavior and relation model or a functional block of the line-of-code behavior and relation model; and linking the unique signature value to the line-of-code behavior and relation model.

In accordance with further embodiments, the operations further comprise assigning the unique signature value to the executable code.

In accordance with further embodiments, the operations further comprise sending the line-of-code behavior and relation model with the assigned signature value to a remote device.

In accordance with further embodiments, the executable code is a software change delta file.

In accordance with further embodiments, the signature value is a hash value.

In accordance with further embodiments, the generating of the line-of-code behavior and relation model is performed through a machine learning process.

In accordance with further embodiments, the machine learning process is a statistical classification process.

In accordance with further embodiments, the machine learning process is a dynamic analysis process.

In accordance with further embodiments, the machine learning process includes determining a sequence of functions associated with the executable code.

In accordance with further embodiments, the machine learning process includes determining a relationship between at least two of the functions of the sequence.

Further disclosed embodiments include a method for generating and signing line-of-code behavior and relation models. The method may comprise identifying executable code for a controller; performing a functional analysis of the executable code to determine a plurality of functions associated with the executable code and a plurality of relationships between the plurality of functions; generating, based on the determined plurality of functions and plurality of relationships, a line-of-code behavior and relation model for the executable code; performing a signature operation on the generated line-of-code behavior and relation model to produce a unique signature value associated with at least one of: the line-of-code behavior and relation model or a functional block of the line-of-code behavior and relation model; and linking the unique signature value to the line-of-code behavior and relation model.

In accordance with further embodiments, the method further comprises assigning the unique signature value to the executable code.

In accordance with further embodiments, the method further comprises sending the line-of-code behavior and relation model with the assigned signature value to a remote device.

In accordance with further embodiments, the executable code is a software change delta file.

In accordance with further embodiments, the unique signature value is a cryptographic nonce number.

In accordance with further embodiments, the controller is a virtual controller.

In accordance with further embodiments, the controller is an electronic control unit (ECU) of a vehicle.

In accordance with further embodiments, linking the unique signature value comprises compressing the relation model.

In accordance with further embodiments, the signature operation is based on a number of the functions associated with the executable code or a type of at least one of the functions.

In accordance with further embodiments, the signature operation is based on a number of the relationships or functions associated with at least one relationship.

In another exemplary embodiment, a non-transitory computer readable medium may include instructions that, when executed by at least one processor, cause the at least one processor to perform operations for using a line-of-code behavior and relation model to determine software functionality changes. The operations may comprise identifying a first portion of executable code and a second portion of executable code; accessing a first line-of-code behavior and relation model representing execution of functions of the first portion of executable code; constructing, based on the second portion of executable code, a second line-of-code behavior and relation model representing execution of functions of the second portion of executable code; performing a functional differential comparison of the first line-of-code behavior and relation model to the second line-of-code behavior and relation model; determining, based on the functional differential comparison, a status of functional equivalence between the first portion of executable code and the code portion of executable code; and generating, based on the determined difference, a report identifying the status of functional equivalence.

In accordance with further embodiments, the status of functional equivalence includes a status of equivalent or not equivalent.

In accordance with further embodiments, the status of functional equivalence includes a degree of equivalence.

In accordance with further embodiments, the operations further comprise: determining that the degree of equivalence does not reach a threshold; and based on determining that the degree of equivalence does not reach a threshold, generating a prompt.

In accordance with further embodiments, the comparison includes determining whether functionality of the first portion of executable code falls within an operational envelope related to at least one of a CPU cycle, a memory requirement, speed of execution, or a functionality relationship.

In accordance with further embodiments, at least one of the execution of functions of the first portion of executable code or the execution of functions of the second portion of executable code is an execution on a physical controller.

In accordance with further embodiments, at least one of the execution of functions of the first portion of executable code or the execution of functions of the second portion of executable code is an execution on a virtualized controller.

In accordance with further embodiments, the functional differential comparison is based on at least one of a difference of: response time, sequence of function execution, or memory leakage.

In accordance with further embodiments, when a result of the functional differential comparison exceeds a threshold, the operations further comprise determining, based on the difference, an estimated probability of downtime.

In accordance with further embodiments, the estimated probability of downtime is expressed as a probability of downtime in a defined time period.

In accordance with further embodiments, the operations further comprise linking at least one of the functions of the second portion of executable code to at least a segment of the second portion of executable code.

In accordance with further embodiments, the accessed line-of-code behavior and relation model was generated according to a machine learning process.

In accordance with further embodiments, the operations further comprise determining, based on the functional differential comparison, that a third portion of executable code is dormant.

In accordance with further embodiments, the first or second line-of-code behavior and relation model was generated dynamically.

In accordance with further embodiments, the first or second line-of-code behavior and relation model was generated statically.

In accordance with further embodiments, the report further identifies at least one instance of functionality drift.

Further disclosed embodiments include a method for using a line-of-code behavior and relation model to determine software functionality changes. The method may comprise identifying a first portion of executable code and a second portion of executable code; accessing a first line-of-code behavior and relation model representing execution of functions of the first portion of executable code; constructing, based on the second portion of executable code, a second line-of-code behavior and relation model representing execution of functions of the second portion of executable code; performing a functional differential comparison of the first line-of-code behavior and relation model to the second line-of-code behavior and relation model; determining, based on the functional differential comparison, a status of functional equivalence between the first portion of executable code and the code portion of executable code; and generating, based on the determined difference, a report identifying the status of functional equivalence.

In accordance with further embodiments, the status of functional equivalence includes a status of equivalent or not equivalent.

In accordance with further embodiments, the comparison includes determining whether functionality of the first portion of executable code falls within an operational envelope related to at least one of a CPU cycle, a memory requirement, speed of execution, or a functionality relationship.

In accordance with further embodiments, the accessed line-of-code behavior and relation model was generated according to a machine learning process.

In another exemplary embodiment, a non-transitory computer readable medium may include instructions that, when executed by at least one processor, cause the at least one processor to perform operations for identifying software interdependencies based on functional line-of-code behavior and relation models. The operations may comprise identifying a first portion of executable code associated with a first controller; accessing a functional line-of-code behavior and relation model representing functionality of the first portion of executable code and a second portion of executable code; determining, based on the functional line-of-code behavior and relation model, that the second portion of executable code is interdependent with the first portion of executable code; and generating, based on the determined interdependency, a report identifying the interdependent first portion of executable code and second portion of executable code.

In accordance with further embodiments, the operations further comprise identifying a first signature uniquely identifying the first portion of executable code and a second signature uniquely identifying the second portion of executable code.

In accordance with further embodiments, the first and second portions of executable code are implemented on a virtualized controller.

In accordance with further embodiments, the second portion of executable code is associated with the first controller.

In accordance with further embodiments, the second portion of executable code is associated with a second controller.

In accordance with further embodiments, the first and second controllers are part of the same device.

In accordance with further embodiments, the device is at least a portion of a vehicle.

In accordance with further embodiments, the operations further comprise determining a functional impact of the first portion of executable code on the second portion of executable code.

In accordance with further embodiments, a first sensitivity value is associated with the first portion of executable code; a second sensitivity value is associated with the second portion of executable code; and the functional impact is based on the first or second sensitivity values.

In accordance with further embodiments, the functional impact is included in the generated report.

In accordance with further embodiments, the operations further comprise generating a visual depiction of the determined interdependency.

In accordance with further embodiments, the operations further comprise determining that the functional impact exceeds a threshold, wherein the visual depiction is based on the determination that the functional impact exceeds the threshold.

In accordance with further embodiments, the visual depiction includes a visual element of the determined interdependency, a visual element of the first portion of executable code, a visual element of the second portion of executable code, and visual elements of other portions of executable code.

Further disclosed embodiments include a method for identifying software interdependencies based on functional line-of-code behavior and relation models. The method may comprise identifying a first portion of executable code associated with a first controller; accessing a functional line-of-code behavior and relation model representing functionality of the first portion of executable code and a second portion of executable code; determining, based on the functional line-of-code behavior and relation model, that the second portion of executable code is interdependent with the first portion of executable code; and generating, based on the determined interdependency, a report identifying the interdependent first portion of executable code and second portion of executable code.

In accordance with further embodiments, the method further comprises identifying a first signature uniquely identifying the first portion of executable code and a second signature uniquely identifying the second portion of executable code.

In accordance with further embodiments, the second portion of executable code is associated with the first controller.

In accordance with further embodiments, the second portion of executable code is associated with a second controller.

In accordance with further embodiments, the method further comprises determining a functional impact of the first portion of executable code on the second portion of executable code.

In accordance with further embodiments, a first sensitivity value is associated with the first portion of executable code; a second sensitivity value is associated with the second portion of executable code; and the functional impact is based on the first or second sensitivity values.

In accordance with further embodiments, the functional impact is included in the generated report.

In another exemplary embodiment, a non-transitory computer readable medium may include instructions that, when executed by at least one processor, cause the at least one processor to perform operations for identifying sources of software-based malfunctions. The operations may comprise identifying a potential software malfunction in a system, the system having multiple code sets associated with a plurality of different software sources; accessing a line-of-code behavior and relation model representing execution of functions of the code sets; identifying, based on the line-of-code behavior and relation model, a code set determined to have the potential to cause, a least in part, the potential software malfunction; and determining a source identifier of the identified code set.

In accordance with further embodiments, the multiple code sets are associated with at least one controller of the system.

In accordance with further embodiments, the accessed line-of-code behavior and relation model was generated dynamically based on data associated with real-time operations of the at least one controller.

In accordance with further embodiments, the line-of-code behavior and relation model represents execution of functions of the identified code set.

In accordance with further embodiments, the multiple code sets are developed by a plurality of different software developers.

In accordance with further embodiments, each of the plurality of different software developers has a unique source identifier.

In accordance with further embodiments, the operations further comprise sending a report of the potential software malfunction to a remote source associated with the identified source identifier.

In accordance with further embodiments, the identification of the potential software malfunction in the system is based on a recent software change to a component of the system.

In accordance with further embodiments, the software change was implemented on the component using a delta file.

In accordance with further embodiments, the operations further comprise sending a report of the potential software malfunction to a remote source associated with the identified source identifier, the delta file is associated with a unique identifier, and the unique identifier is included in the report.

In accordance with further embodiments, the operations further comprise reverting software on the component by delinking the delta file from current software on the component.

In accordance with further embodiments, the system is a virtual system.

Further disclosed embodiments include a method for identifying sources of software-based malfunctions. The method may comprise identifying a potential software malfunction in a system, the system having multiple code sets associated with a plurality of different software sources; accessing a line-of-code behavior and relation model representing execution of functions of the code sets; identifying, based on the line-of-code behavior and relation model, a code set determined to have caused, a least in part, the potential software malfunction; and determining a source identifier of the identified code set.

In accordance with further embodiments, the multiple code sets are associated with at least one controller of the system.

In accordance with further embodiments, the accessed line-of-code behavior and relation model was generated dynamically based on data associated with real-time operations of the at least one controller.

In accordance with further embodiments, the line-of-code behavior and relation model represents execution of functions of the identified code set.

In accordance with further embodiments, the multiple code sets are developed by a plurality of different software developers.

In accordance with further embodiments, each of the plurality of different software developers has a unique source identifier.

In accordance with further embodiments, the operations further comprise sending a report of the potential software malfunction to a remote source associated with the identified source identifier.

In accordance with further embodiments, the identification of the potential software malfunction in the system is based on a delta file executed in the system.

In another exemplary embodiment, a non-transitory computer readable medium may include instructions that, when executed by at least one processor, cause the at least one processor to perform operations for analyzing hardware change impacts based on at least one functional line-of-code behavior and relation model. The operations may comprise identifying a new hardware component associated with a system; accessing a first line-of-code behavior and relation model representing execution of functions using the new hardware component; accessing a second line-of-code behavior and relation model representing execution of functions on a previous hardware component of the system; performing a functional differential comparison of the first line-of-code behavior and relation model to the second line-of-code behavior and relation model; determining, based on the functional differential comparison, a status of functional equivalence between the new hardware component and the previous hardware component; and generating, based on the determined difference, a report identifying the status of functional equivalence.

In accordance with further embodiments, the second line-of-code behavior and relation model was generated dynamically based on data associated with real-time operations of the previous hardware component.

In accordance with further embodiments, the first line-of-code behavior and relation model was generated based on data associated with simulated operations of the new hardware component.

In accordance with further embodiments, the new hardware component is a controller.

In accordance with further embodiments, the system is a vehicle and the controller is an electronic control unit (ECU).

In accordance with further embodiments, the operations further comprise, based on the determined difference, determining that the new hardware component is unauthorized.

In accordance with further embodiments, the operations further comprise, based on determining that the new hardware component is unauthorized, blocking operation of the new hardware component.

In accordance with further embodiments, the controller is a first controller, the operations further comprise determining that at least one hardware component is a second controller dependent with the first controller.

In accordance with further embodiments, the previous hardware component is to be replaced by the new hardware component.

In accordance with further embodiments, the operations further comprise determining that at least one hardware component is interdependent with the new hardware component.

In accordance with further embodiments, the operations further comprise: accessing a third line-of-code behavior and relation model, the third model representing execution of functions on at least one dependent hardware component and the previous hardware component; generating a fourth line-of-code behavior and relation model, the fourth model representing execution of functions on the at least one dependent hardware component and the new hardware component; performing a functional differential comparison of the third model to the fourth model; determining, based on the functional differential comparison, a change in functional equivalence within the system; and generating, based on the determined difference, a report identifying the change.

Further disclosed embodiments include a method for analyzing hardware change impacts based on at least one functional line-of-code behavior and relation model. The method may comprise identifying a new hardware component associated with a system; accessing a first line-of-code behavior and relation model representing execution of functions using the new hardware component; accessing a second line-of-code behavior and relation model representing execution of functions on a previous hardware component of the system; performing a functional differential comparison of the first line-of-code behavior and relation model to the second line-of-code behavior and relation model; determining, based on the functional differential comparison, a status of functional equivalence between the new hardware component and the previous hardware component; and generating, based on the determined difference, a report identifying the status of functional equivalence.

In accordance with further embodiments, the second line-of-code behavior and relation model was generated dynamically based on data associated with real-time operations of the previous hardware component.

In accordance with further embodiments, the first line-of-code behavior and relation model was generated based on data associated with simulated operations of the new hardware component.

In accordance with further embodiments, the operations further comprise, based on the determined difference, determining that the new hardware component is unauthorized.

In accordance with further embodiments, the operations further comprise, based on determining that the new hardware component is unauthorized, blocking operation of the new hardware component.

In accordance with further embodiments, the controller is a first controller, and the operations further comprise determining that at least one hardware component is a second controller dependent with the first controller.

In accordance with further embodiments, the previous hardware component is to be replaced by the new hardware component.

In accordance with further embodiments, the operations further comprise determining that at least one hardware component is interdependent with the new hardware component.

In accordance with further embodiments, the operations further comprise: accessing a third line-of-code behavior and relation model, the third model representing execution of functions on at least one dependent hardware component and the previous hardware component; generating a fourth line-of-code behavior and relation model, the fourth model representing execution of functions on the at least one dependent hardware component and the new hardware component; performing a functional differential comparison of the third model to the fourth model; determining, based on the functional differential comparison, a change in functional equivalence within the system; and generating, based on the determined difference, a report identifying the change.

In another exemplary embodiment, a non-transitory computer readable medium may include instructions that, when executed by at least one processor, cause the at least one processor to perform operations for identifying software dependencies based on functional line-of-code behavior and relation models. The operations may comprise accessing a first line-of-code behavior and relation model representing execution of functions of a first portion of executable code, the first portion of executable code being associated with a first symbol; detecting a change to the first portion of executable code; constructing, based on the changed first portion of executable code, a second line-of-code behavior and relation model representing execution of functions of the changed first portion of executable code; determining, based on the constructed second model, a dependency between (i) the changed first portion of executable code or the first symbol and (ii) a second symbol; and generating, based on the determined difference, a report identifying the dependency.

In accordance with further embodiments, the second symbol is at least one of a variable, buffer, function, call, object, or segment of code.

In accordance with further embodiments, the operations further comprise determining an impact to the second symbol caused by the changed first portion of executable code, the report further identifying the impact.

In accordance with further embodiments, a first sensitivity value is associated with the first portion of executable code; a second sensitivity value is associated with the second symbol; and the impact is based on the first or second sensitivity values.

In accordance with further embodiments, the first portion of executable code is configured to execute on a first controller and the second symbol is associated with a second controller.

In accordance with further embodiments, the operations further comprise determining the dependency by operating the second model remotely from the first and second controllers.

In accordance with further embodiments, the first and second controllers are part of a group of electronic control units (ECUs) in a vehicle.

In accordance with further embodiments, the dependency includes a strength of association between the first symbol and the second symbol.

In accordance with further embodiments, the strength of association is based on a frequency with which the first symbol interacts with the second symbol.

In accordance with further embodiments, the strength of association is based on the first portion of executable code being configured to call or modify the second symbol.

In accordance with further embodiments, the operations further comprise generating a visual depiction of the determined dependency.

Further disclosed embodiments include a method for identifying software dependencies based on functional line-of-code behavior and relation models. The method may comprise accessing a first line-of-code behavior and relation model representing execution of functions of a first portion of executable code, the first portion of executable code being associated with a first symbol; detecting a change to the first portion of executable code; constructing, based on the changed first portion of executable code, a second line-of-code behavior and relation model representing execution of functions of the changed first portion of executable code; determining, based on the constructed second model, a dependency between (i) the changed first portion of executable code or the first symbol and (ii) a second symbol; and generating, based on the determined difference, a report identifying the dependency.

In accordance with further embodiments, the second symbol is at least one of a variable, buffer, function, call, object, or segment of code.

In accordance with further embodiments, the operations further comprise determining an impact to the second symbol caused by the changed first portion of executable code, the report further identifying the impact.

In accordance with further embodiments, a first sensitivity value is associated with the first portion of executable code; a second sensitivity value is associated with the second symbol; and the impact is based on the first or second sensitivity values.

In accordance with further embodiments, the first portion of executable code is configured to execute on a first controller and the second symbol is associated with a second controller.

In accordance with further embodiments, the first and second controllers are part of a group of electronic control units (ECUs) in a vehicle.

In accordance with further embodiments, the dependency includes a strength of association between the first symbol and the second symbol.

In accordance with further embodiments, the strength of association is based on a frequency with which the first symbol interacts with the second symbol.

In accordance with further embodiments, the strength of association is based on the first portion of executable code being configured to call or modify the second symbol.

In another exemplary embodiment, a non-transitory computer readable medium may include instructions that, when executed by at least one processor, cause the at least one processor to perform operations for analyzing software delta changes based on functional line-of-code behavior and relation models. The operations may comprise identifying a prompt to change a first version of code on a controller to a second version of code; constructing, based on the identified prompt, a line-of-code behavior and relation model representing execution of functions of the controller based on the second version of code; performing a signature operation on the generated line-of-code behavior and relation model to produce a signature value; and sending the signature value to the controller; and the controller is configured to compare the signature value to a computed signature value that the controller is configured to compute based on the second version of code and determine, based on the comparison, whether to validate the second version of code.

In accordance with further embodiments, the prompt comprises a delta file.

In accordance with further embodiments, the controller is further configured to, based on the validation, execute the second version of code on the controller.

In accordance with further embodiments, the controller is further configured to, based on the validation, prevent execution of the second version of code on the controller.

In accordance with further embodiments, the controller is further configured to, based on the validation, notify a remote source associated with the second version of code.

In accordance with further embodiments, the second version of code is deployed subsequent to the first version of code.

In accordance with further embodiments, the line-of-code behavior and relation model is a first line-of-code behavior and relation model; and the computing of the computed signature value comprises constructing, based on the identified prompt, a second line-of-code behavior and relation model representing execution of functions of the controller based on the second version of code.

In accordance with further embodiments, the computed signature value is computed by using the signature operation.

In accordance with further embodiments, at least one of the first or second line-of-code behavior and relation models was generated dynamically based on data associated with real-time operations of the controller.

In accordance with further embodiments, the first and second line-of-code behavior and relation models were generated dynamically based on data associated with real-time operations of the controller, the data being limited based on a group of parameters set remotely from the controller.

In accordance with further embodiments, the signature operation is based on an identifier of the controller.

In accordance with further embodiments, the signature operation is based on a type, function, version of software, sensitivity value, age, or processing capacity of the controller.

Further disclosed embodiments include a method for analyzing software delta changes based on functional line-of-code behavior and relation models. The method may comprise identifying a prompt to change a first version of code on a controller to a second version of code; constructing, based on the identified prompt, a line-of-code behavior and relation model representing execution of functions of the controller based on the second version of code; performing a signature operation on the generated line-of-code behavior and relation model to produce a signature value; and sending the signature value to the controller; and the controller is configured to compare the signature value to a computed signature value that the controller is configured to compute based on the second version of code and determine, based on the comparison, whether to validate the second version of code.

In accordance with further embodiments, the prompt comprises a delta file.

In accordance with further embodiments, the controller is further configured to, based on the validation, execute the second version of code on the controller.

In accordance with further embodiments, the line-of-code behavior and relation model is a first line-of-code behavior and relation model; and the computing of the computed signature value comprises constructing, based on the identified prompt, a second line-of-code behavior and relation model representing execution of functions of the controller based on the second version of code.

In accordance with further embodiments, the computed signature value is computed by using the signature operation.

In accordance with further embodiments, at least one of the first or second line-of-code behavior and relation models was generated dynamically based on data associated with real-time operations of the controller.

In accordance with further embodiments, the first and second line-of-code behavior and relation models were generated dynamically based on data associated with real-time operations of the controller, the data being limited based on a group of parameters set remotely from the controller.

In accordance with further embodiments, the signature operation is based on a type, function, version of software, sensitivity value, age, or processing capacity of the controller.

In another exemplary embodiment, a non-transitory computer readable medium may include instructions that, when executed by at least one processor, cause the at least one processor to perform operations for analyzing control-flow integrity based on functional line-of-code behavior and relation models. The operations may comprise receiving data based on runtime operations of a controller; constructing a line-of-code behavior and relation model representing execution of functions on the controller based on the received data; constructing, based on the line-of-code behavioral and relation model, a dynamic control flow integrity model configured for the controller to enforce in real-time; and deploying the dynamic control flow integrity model to the controller.

In accordance with further embodiments, the controller is configured to detect a request to execute code on the controller, and compare the requested execution to the dynamic control flow integrity model.

In accordance with further embodiments, the controller is configured to deny execution of the code on the controller if the requested execution violates the dynamic control flow integrity model.

In accordance with further embodiments, the controller is configured to generate an alert if the requested execution violates the dynamic control flow integrity model.

In accordance with further embodiments, the operations further comprise identifying a software change to the controller, wherein the line-of-code behavior and relation model is constructed based on the identified software change.

In accordance with further embodiments, the controller is a first controller; and the data is further based on runtime operations of a second controller.

In accordance with further embodiments, the operations are performed periodically according to a period based on a sensitivity value associated with the controller.

In accordance with further embodiments, the received data comprises multiple datasets associated with different runtime operations, and the operations further comprise applying a machine learning process to the multiple datasets to produce analytical data, wherein the construction of the line-of-code behavior and relation model is based on the analytical data.

In accordance with further embodiments, the operations further comprise: performing a signature operation on the constructed line-of-code behavior and relation model to produce a signature value; and deploying the dynamic control flow integrity model to the controller with the signature value.

In accordance with further embodiments, the controller is configured to compare the signature value to a computed signature value that the controller is configured to compute based on the received data and determine, based on the comparison, whether to validate the dynamic control flow integrity model.

Further disclosed embodiments include a method for analyzing control-flow integrity based on functional line-of-code behavior and relation models. The method may comprise receiving data based on runtime operations of a controller; constructing a line-of-code behavior and relation model representing execution of functions on the controller based on the received data; constructing, based on the line-of-code behavioral and relation model, a dynamic control flow integrity model configured for the controller to enforce in real-time; and deploying the dynamic control flow integrity model to the controller.

In accordance with further embodiments, the controller is configured to detect a request to execute code on the controller, and compare the requested execution to the dynamic control flow integrity model.

In accordance with further embodiments, the controller is configured to deny execution of the code on the controller if the requested execution violates the dynamic control flow integrity model.

In accordance with further embodiments, the controller is configured to generate an alert if the requested execution violates the dynamic control flow integrity model.

In accordance with further embodiments, the operations further comprise identifying a software change to the controller, wherein the line-of-code behavior and relation model is constructed based on the identified software change.

In accordance with further embodiments, the controller is a first controller; and the data is further based on runtime operations of a second controller.

In accordance with further embodiments, the operations are performed periodically according to a period based on a sensitivity value associated with the controller.

In accordance with further embodiments, the received data comprises multiple datasets associated with different runtime operations, the operations further comprise applying a machine learning process to the multiple datasets to produce analytical data, wherein the construction of the line-of-code behavior and relation model is based on the analytical data.

In accordance with further embodiments, the operations further comprise: performing a signature operation on the constructed line-of-code behavior and relation model to produce a signature value; and deploying the dynamic control flow integrity model to the controller with the signature value.

In accordance with further embodiments, the controller is configured to compare the signature value to a computed signature value that the controller is configured to compute based on the received data and determine, based on the comparison, whether to validate the dynamic control flow integrity model.

In another exemplary embodiment, a non-transitory computer readable medium may include instructions that, when executed by at least one processor, cause the at least one processor to perform operations for visualizing and configuring controller function sequences. The operations may comprise identifying at least one executable code segment associated with a controller; analyzing the at least one executable code segment to determine at least one function and at least one functional relationship associated with the at least one code segment; constructing, a software functionality line-of-code behavior and relation model visually depicting the determined at least one function and at least one functional relationship; displaying the software functionality line-of-code behavior and relation model at a user interface; receiving a first input at the user interface; in response to the received first input, animating the line-of-code behavior and relation model to visually depict execution of the at least one executable code segment on the controller; receiving a second input at the user interface; and in response to the received second input, animating an update to the line-of-code behavior and relation model.

In accordance with further embodiments, the operations further comprise: determining expected functional behavior of the controller and actual functional behavior of the controller based on the analysis; and displaying, at the user interface, a visual indicator of functional behavior corresponding to the execution of the at least one executable code segment relative to expected functional behavior.

In accordance with further embodiments, the operations further comprise: determining a degree of deviation between the expected and actual functional behaviors; estimating a probability of downtime for the controller based on the degree of deviation; and displaying an indication of the probability of downtime at the user interface.

In accordance with further embodiments, the operations further comprise accessing executable code configured to execute a software change on the controller.

In accordance with further embodiments, the operations further comprise sending an alert to a remote device.

In accordance with further embodiments, animating the line-of-code behavior and relation model to visually depict execution of the at least one executable code segment comprises emphasizing a visual element of the at least one function associated with the at least one code segment.

In accordance with further embodiments, the second input is associated with a code change on the controller.

In accordance with further embodiments, the controller is an electronic control unit (ECU) of a vehicle.

In accordance with further embodiments, the controller is a virtual controller.

In accordance with further embodiments, the code change is represented by a delta file configured to change code on the controller.

In accordance with further embodiments, the delta file is configured to change code on the controller from a first version of code to a second version of code.

Further disclosed embodiments include a method for visualizing and configuring controller function sequences. The method may comprise identifying at least one executable code segment associated with a controller; analyzing the at least one executable code segment to determine at least one function and at least one functional relationship associated with the at least one code segment; constructing, a software functionality line-of-code behavior and relation model visually depicting the determined at least one function and at least one functional relationship; displaying the software functionality line-of-code behavior and relation model at a user interface; receiving a first input at the user interface; in response to the received first input, animating the line-of-code behavior and relation model to visually depict execution of the at least one executable code segment on the controller; receiving a second input at the user interface; and in response to the received second input, animating an update to the line-of-code behavior and relation model.

In accordance with further embodiments, the operations further comprise: determining expected functional behavior of the controller and actual functional behavior of the controller based on the analysis; and displaying, at the user interface, a visual indicator of functional behavior corresponding to the execution of the at least one executable code segment relative to expected functional behavior.

In accordance with further embodiments, the operations further comprise: determining a degree of deviation between the expected and actual functional behaviors; estimating a probability of downtime for the controller based on the degree of deviation; and displaying an indication of the probability of downtime at the user interface.

In accordance with further embodiments, the operations further comprise accessing executable code configured to execute a software change on the controller.

In accordance with further embodiments, the operations further comprise sending an alert to a remote device.

In accordance with further embodiments, animating the line-of-code behavior and relation model to visually depict execution of the at least one executable code segment comprises emphasizing a visual element of the at least one function associated with the at least one code segment.

In accordance with further embodiments, the second input is associated with a code change on the controller.

In accordance with further embodiments, the code change is represented by a delta file configured to change code on the controller.

In accordance with further embodiments, the delta file is configured to change code on the controller from a first version of code to a second version of code.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DETAILED DESCRIPTION OF EXEMPLARY EMBODIMENTS

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

Figure 1A:
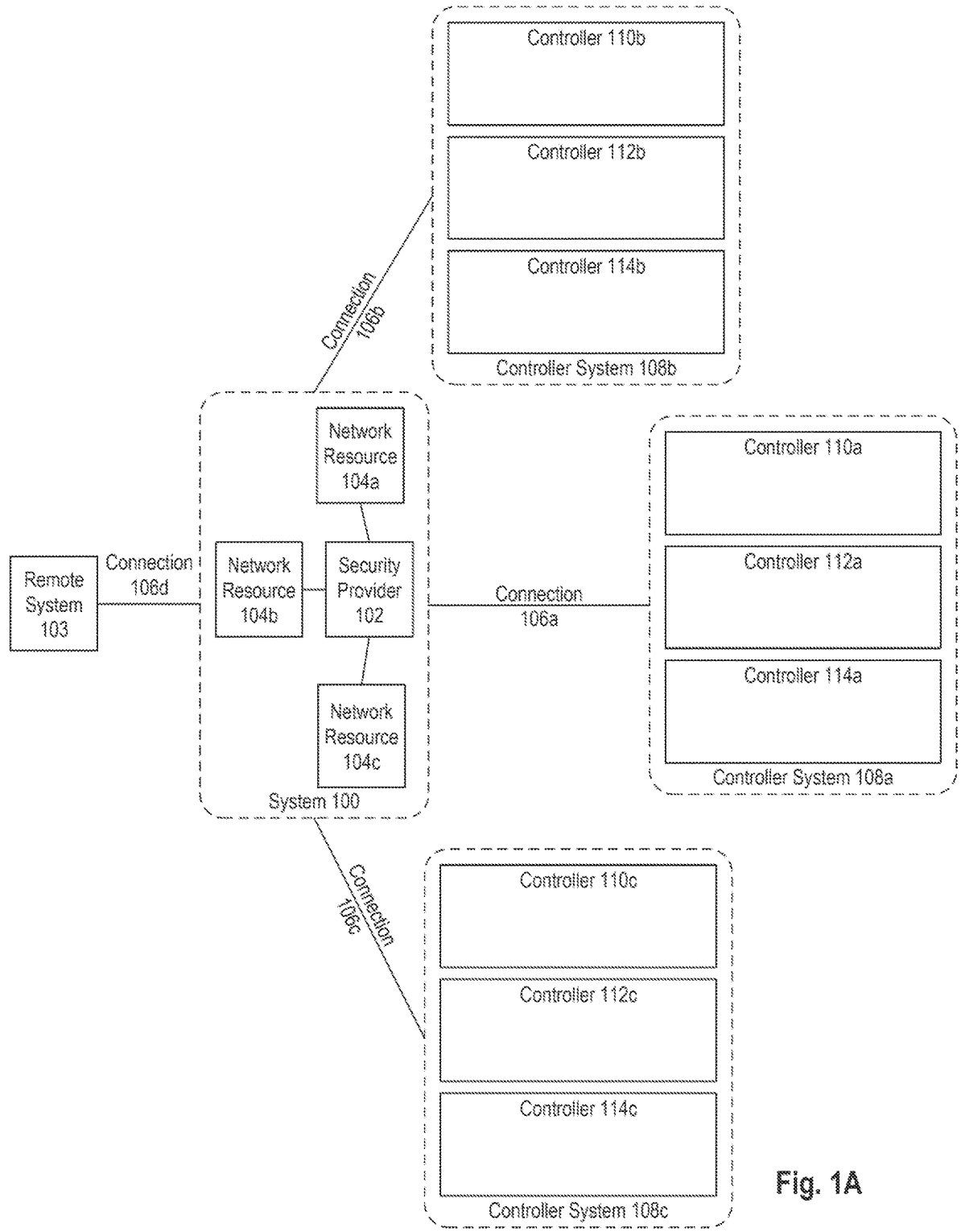
FIG. 1A illustrates an exemplary pictographic representation of a controller network for providing analysis and security to controllers, consistent with embodiments of the present disclosure.

FIG. 1A illustrates an exemplary pictographic representation of system 10, which may include a system 100. System 100 may be maintained by a security provider, software developer, an entity associated with developing or improving computer software, or any combination of these entities. System 100 may include a security provider 102, which may be a single device or combination of devices, and is described in further detail with respect to FIG. 1C. Security provider 102 may be in communication with any number of network resources, such as network resources 104a, 104b, and/or 104c. A network resource may be a database, supercomputer, general purpose computer, special purpose computer, virtual computing resource, or any other data storage or processing resource.

System 10 may also include any number of controller systems, such as controller systems 108a, 108b, and 108c. A controller system may be, for example, a home security system, a parking garage sensor system, a vehicle, an inventory monitoring system, a connected appliance, telephony equipment, a network routing device, a smart power grid system, a drone or other unmanned vehicle, a hospital monitoring system, or any other Internet of Things (IoT)

system. A controller system may include controllers arranged in a local area network (LAN), a wide area network (WAN), or any other communications network arrangement. Further, each controller system may include any number of controllers. For example, exemplary controller system 108a includes controllers 110a, 112a, and 114a, which may have the same or different functionalities or purposes. These controllers are discussed further through the description of exemplary controller 114a, discussed with respect to FIG. 1B. Controller systems 108a, 108b, and 108c may connect to system 100 through connections 106a, 106b, and 106c, respectively. System 100 may also connect through connection 106d to a remote system 103, which may include any number of computing devices (e.g., including a personal desktop computer). Remote system 103 may be associated with a creator of code, a manufacturer of a physical component and/or device (e.g., controller), a system (e.g., vehicle) manufacturer, or another entity associated with developing and/or deploying software. A connection 106 may be a communication channel, which may include a bus, a cable, a wireless (e.g., over-the-air) communication channel, a radio-based communication channel, a local area network (LAN), the Internet, a wireless local area network (WLAN), a wide area network (WAN), a cellular communication network, or any Internet Protocol (IP) based communication network and the like. Connections 106a, 106b, 106c, and 106d may be of the same type or of different types.

Any combination of components of system 10 may perform any number of steps of the exemplary processes discussed herein, consistent with the disclosed exemplary embodiments.

Figure 1B:
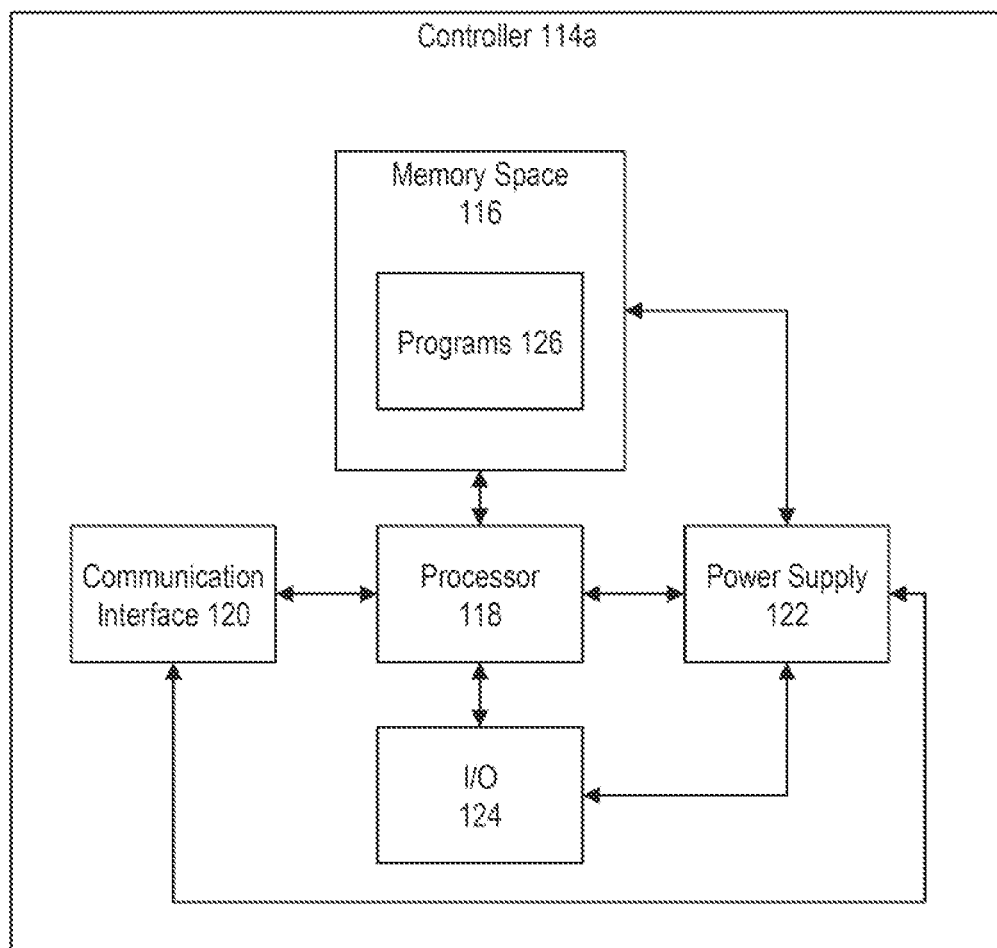
FIG. 1B illustrates an exemplary pictographic representation of a controller, consistent with embodiments of the present disclosure.

FIG. 1B illustrates an exemplary pictographic representation of controller 114a, which may be an automotive controller, such as an electronic control unit (ECU) (e.g., manufactured by companies such as Bosch™, Delphi Electronics™, Continental™, Denso™, etc.), or may be a non-automotive controller, such as an IoT controller manufactured by Skyworks™, Qorvo™, Qualcomm®, NXP Semiconductors™, etc. Controller 114a may be configured (e.g., through programs 126) to perform a single function (e.g., a braking function in a vehicle), or multiple functions. Controller 114a may perform any number of steps of the exemplary processes discussed herein, consistent with the disclosed exemplary embodiments.

Controller 114a may include a memory space 116 and a processor 118. Memory space 116 may a single memory component, or multiple memory components. Such memory components may include an electronic storage device, a magnetic storage device, an optical storage device, an electromagnetic storage device, a semiconductor storage device, or any suitable combination of the foregoing. For example, memory space 116 may include any number of hard disks, random access memories (RAMs), read-only memories (ROMs), erasable programmable read-only memories (EPROMs or Flash memories), and the like. Memory space 116 may include one or more storage devices configured to store instructions usable by process 118 to perform functions related to the disclosed embodiments. For example, memory space 116 may be configured with one or more software instructions, such as software program(s) 126 or code segments that perform one or more operations when executed by processor 118 (e.g., the operations discussed in connection with figures below). The disclosed embodiments are not limited to separate programs or computers configured to perform dedicated tasks. For example, memory space 116 may include a single program or multiple programs that perform the functions of system 10. Memory space 116 may also store data that is used by one or more software programs (e.g., data relating to ECU functions, data obtained during operation of the vehicle, or other data).

In certain embodiments, memory space 116 may store software executable by processor 118 to perform one or more methods, such as the methods discussed below. The software may be implemented via a variety of programming techniques and languages, such as C or MISRA-C, ASCET, Simulink, Stateflow, and various others. Further, it should be emphasized that techniques disclosed herein are not limited to automotive embodiments. Various other IoT environments may use the disclosed techniques, such as smart home appliances, network security or surveillance equipment, smart utility meters, connected sensor devices, parking garage sensors, and many more. In such embodiments, memory space 116 may store software based on a variety of programming techniques and languages such as C, C++, PHP, Java, JavaScript, Python, and various others.

Processor 118 may include one or more dedicated processing units, application-specific integrated circuits (ASICs), field-programmable gate arrays (FPGAs), graphical processing units, or various other types of processors or processing units coupled with memory space 116.

Controller 114a may also include a communication interface 120, which may allow for remote devices to interact with controller 114a. Communication interface 120 may include an antenna or wired connection to allow for communication to or from controller 114a. For example, an external device (such as controller 114b, controller 116a, security provider 102, or any other device capable of communicating with controller 114a) may send code to controller 114a instructing controller 114a to perform certain operations, such as changing software stored in memory space 116.

Controller 114a may also include power supply 122, which may be an AC/DC converter, DC/DC converter, regulator, or battery internal to a physical housing of controller 114a, and which may provide electrical power to controller 114a to allow its components to function. In some embodiments, a power supply 122 may exist external to a physical housing of a controller (i.e., may not be included as part of controller 114a itself), and may supply electrical power to multiple controllers (e.g., all controllers within controller system 108a).

Controller 114a may also include input/output device (I/O) 124, which may be configured to allow for a user or device to interact with controller 114a. For example, I/O 124 may include at least one of wired and/or wireless network cards/chip sets (e.g., WiFi-based, cellular based, etc.), an antenna, a display (e.g., graphical display, textual display, etc.), an LED, a router, a touchscreen, a keyboard, a microphone, a speaker, a haptic device, a camera, a button, a dial, a switch, a knob, a transceiver, an input device, an output device, or another I/O device configured to perform, or to allow a user to perform, any number of steps of the methods of the disclosed embodiments, as discussed further below.

Figure 1C:
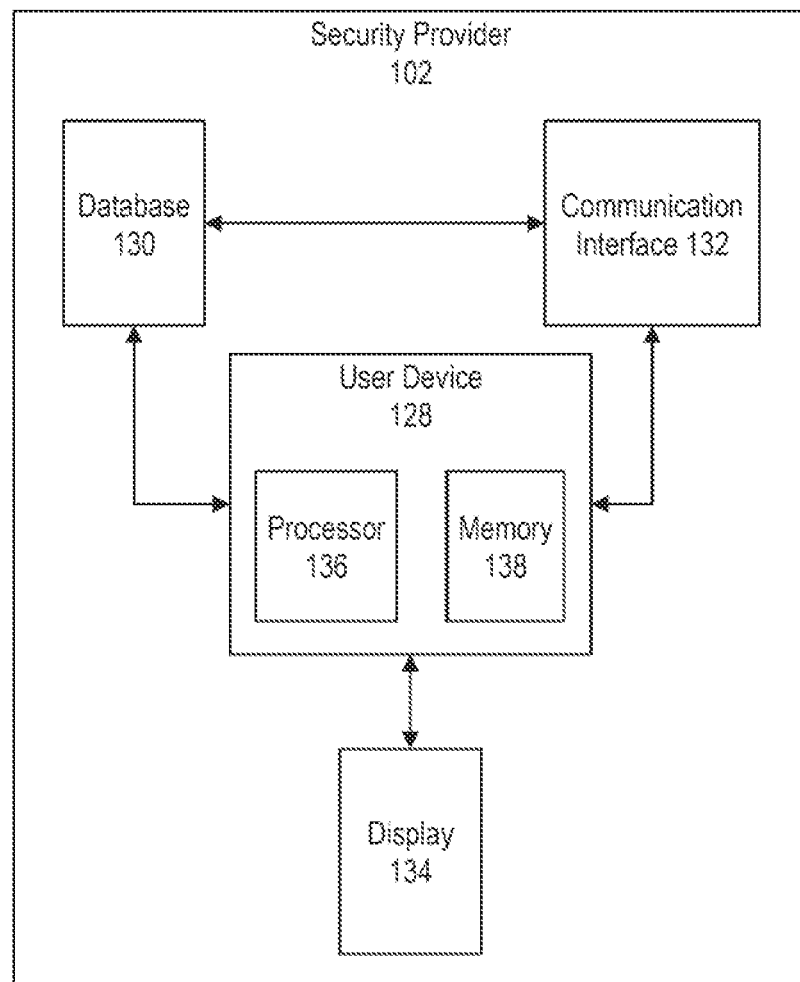
FIG. 1C illustrates an exemplary pictographic representation of a security provider system, consistent with embodiments of the present disclosure.

FIG. 1C illustrates an exemplary pictographic representation of security provider 102, which may be a single device or multiple devices. In the embodiment shown, security provider 102 includes a user device 128, which may be a computer, server, mobile device, special purpose computer, or any other computing device that may allow a user to perform any number of steps of the methods of the disclosed embodiments, as discussed further below. For example, user device 128 may include a processor 136, which may be configured to execute instructions stored at memory 138.

User device 128 may also connect to database 130, which may be an instance of a network resource, such as network resource 104*a*. Database 130 may store data to be used in methods of the disclosed embodiments, as discussed further below. For example, database 130 may maintain any number of models, consistent with the disclosed embodiments. Database 130 may include any number of disk drives, servers, server arrays, server blades, memories, or any other medium capable of storing data. Database 130 may be configured in a number of fashions, including as a textual database, a centralized database, a distributed database, a hierarchical database, a relational database (e.g., SQL), an object-oriented database, or in any other configuration suitable for storing data. While database 130 is shown within security provider 102, it may also exist externally to it, such as at a remote cloud computing platform.

In some embodiments, user device 128 may connect to a communication interface 132, which may be similar to communication interface 120 and/or 1/O 124. For example, communication interface 132 may include at least one of wired and/or wireless network cards/chip sets (e.g., WiFi-based, cellular based, etc.), an antenna, a display (e.g., graphical display, textual display, etc.), an LED, a router, a touchscreen, a keyboard, a mouse, a microphone, a speaker, a haptic device, a camera, a button, a dial, a switch, a knob, a transceiver, an input device, an output device, or another device configured to perform, or to allow a user to perform, any number of steps of the methods of the disclosed embodiments, as discussed further below. Communication interface 132 may also allow user device 128 to connect to other devices, such as other devices within security provider 102, other devices within a system 100, and/or devices external to system 100, such as a controller 114*a*. In some embodiments, communication interface 132 (e.g., an antenna) may connect with database 130, which may allow for a device other than user device 128 (e.g., a controller external to system 100) to communicate with database 130.

Security provider 102 may also include a display 134, which may be connected to user device 128. Display 134 may include a liquid crystal display (LCD), in-plane switching liquid crystal display (IPS-LCD), light-emitting diode (LED) display, organic light-emitting diode (OLED) display, active-matrix organic light-emitting diode (AMOLED) display, cathode ray tube (CRT) display, plasma display panel (PDP), digital light processing (DLP) display, or any other display capable of connecting to a user device and depicting information to a user. Display 134 may display graphical interfaces, interactable graphical elements, animations, dynamic graphical elements, and any other visual element, such as those discussed with respect to FIG. 14, among others.

Figure 2:
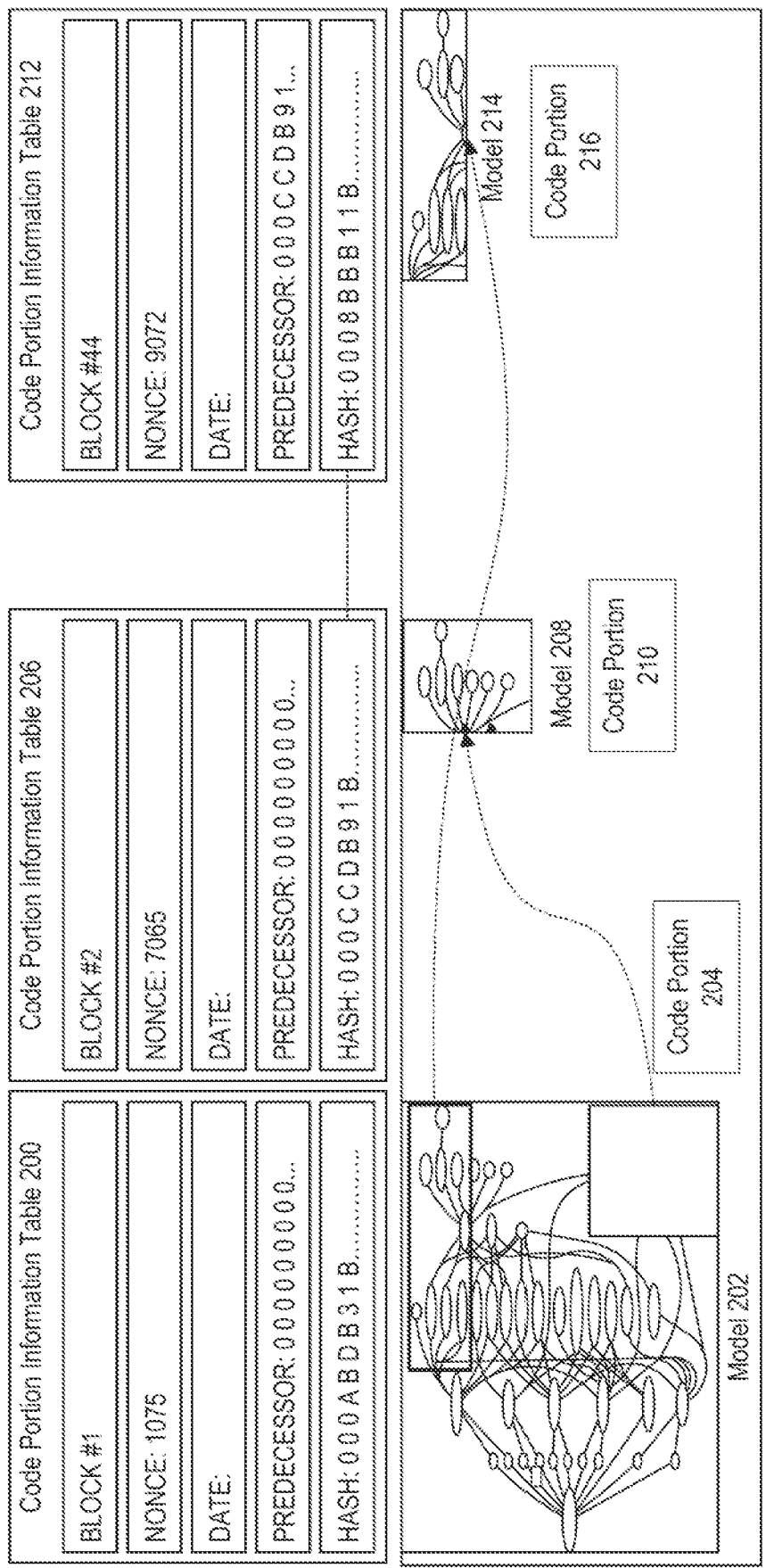
FIG. 2 illustrates an exemplary pictographic representation of a set of models with corresponding information tables, consistent with embodiments of the present disclosure.

FIG. 2 illustrates an exemplary pictographic representation of a set of models with corresponding information tables and code portions. Any of these exemplary models may include a line-of-code behavior and relation model, such as is discussed with respect to FIG. 3 (e.g., a line-of-code behavior and relation model 30), among others. The exemplary embodiment in FIG. 2 depicts a model 202, which includes model 208 and model 214, which are parts of it. Models 202, 208, and 214 may model code portions (e.g., code for execution on a controller) 204, 210, and 216, respectively. By way of example, model 202 may model computer code (e.g., code portion 204) configured to coordinate operations of an ECU associated with turning a vehicle's rack and pinion, and model 208 and/or model 214 may model computer code (e.g., code portion 210 and/or 216) configured to add or remove functions or relationships, or otherwise change the capabilities of initial computer code modeled by model 202 (e.g., adding a feature of communication with a blind spot monitor, to prevent the rack and pinion from turning when the blind spot monitor detects an object in the vehicle's path). Any of these exemplary models may be generated as discussed with respect to FIG. 6, among others.

FIG. 2 also illustrates code portion information tables 200, 206, and 212, which are associated with models 202, 208, and 214 respectively. A code portion information table may contain information of each respective model and/or code portion, and may be labeled with a different block number and/or date associated with the model and/or code portion (e.g., a date when the associated model or code portion was created, modified, deployed, etc.). In some embodiments, a code portion information table may hold a nonce, or any other number generated such that it can only be used once within a given system. A nonce may be generated using information associated with a model and/or code portion, such as sequence of code, combination of functions, combination of functional relationships, type of device to which a model or code portion relates, a time when the code portion was analyzed, or any other information that may be unique to a model and/or code portion.

In some embodiments, a code portion information table may hold a hash value and/or a predecessor hash value. Any of these hash values may have been generated according to a hash function, described in further detail regarding FIG. 6. The hash value may uniquely identify the model and/or its underlying code portion. The predecessor hash value may identify a model and/or code portion that was previously associated with (e.g., was a previous version of) the model and/or code portion with which the information table is associated. In this way, an identification linkage may be created between subsequent changes to software, such that changes may be tracked from a code perspective and functional perspective, and allowing for deeper analysis and rollback of software deployment. While the term "hash" is used to describe this information in a code portion information table, it should be noted that any unique value may be used as a hash value and/or predecessor hash value, which may or may not be generated by a hash function.

Figure 3:
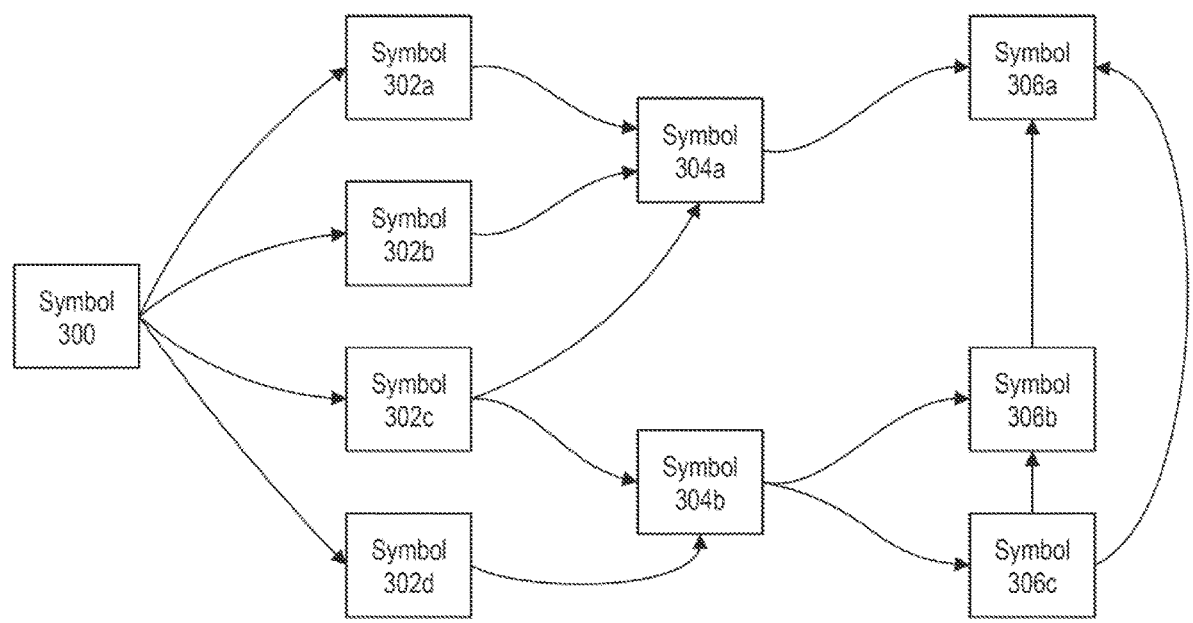
FIG. 3 illustrates an exemplary pictographic representation of a line-of-code behavior and relation model, consistent with embodiments of the present disclosure.

FIG. 3 illustrates an exemplary pictographic representation of line-of-code behavior and relation model 30, which may be generated by a processor (e.g., a processor at user device 128) according to a process (e.g., process 600). A line-of-code behavior and relation model 30 may be expressed in data and stored on a storage medium, such as database 130 or memory space 116). A line-of-code behavior and relation model may relate to any quantity of code (e.g., one line of code, multiple lines of code, a program, etc.). In some embodiments, a line-of-code behavior and relation model may be created or modified through analysis of code configured for execution on a controller (e.g., offline analysis at a security provider 102, such as through simulating behavior of a device, which may be based on real-time "online" behavior). A line-of-code behavior and relation model may be used "online" by applying real-time (or in some embodiments, simulated) controller operations to the model, to demonstrate functioning of code on the controller. The term "line-of-code" is not necessarily limited to literal lines of code, but may also include, instead of or in addition to lines of code, symbols (discussed below), symbol relationships (also discussed below), compiled code, uncompiled code, a software package (e.g., for a software update), instruction sets, and/or any software whose functionality or behavior may be analyzed.

A line-of-code behavior and relation model 30 may describe any number of symbols, such as symbol 300, symbol 302c, symbol 306b, etc. A symbol may represent and/or store a number of pieces of information, including a variable, buffer, function, call, object, segment of code, a controller to which the symbol relates, a system to which the symbol relates, or any other information related to the functional impact of code related to the symbol. In some embodiments, a symbol may include a functional block, which may describe a functional profile of a segment of code. A functional profile may be developed through manual user inputs and/or machine-observed (e.g., through simulation) behavior. In some embodiments, a line-of-code behavior and relation model 30 may be stochastic, deterministic, steady-state, dynamic, continuous, discrete, local, etc. In some embodiments, a line-of-code behavior and relation model 30 may include a functional call graph for code (e.g., based on gprof, OpenPAT, pprof, etc.).

As indicated in FIG. 3 by the arrows between symbols, symbols may influence each other (i.e., they have a symbol relationship). By way of example, symbol 302d may represent a buffer that is called by a function represented by symbol 304b in a process to update a variable represented by symbol 306a. While the arrows in this exemplary figure are shown moving from left to right, any combination of symbol relationships (e.g., dependencies, interdependencies, etc.) between symbols is possible. Symbol relationships may be one-directional or bi-directional between symbols. Symbol relationships may also represent an iterative or recursive relationship between symbols. In some embodiments, a symbol relationship may influence another symbol relationship in addition to, or in place of, influencing another symbol.

Figure 4:
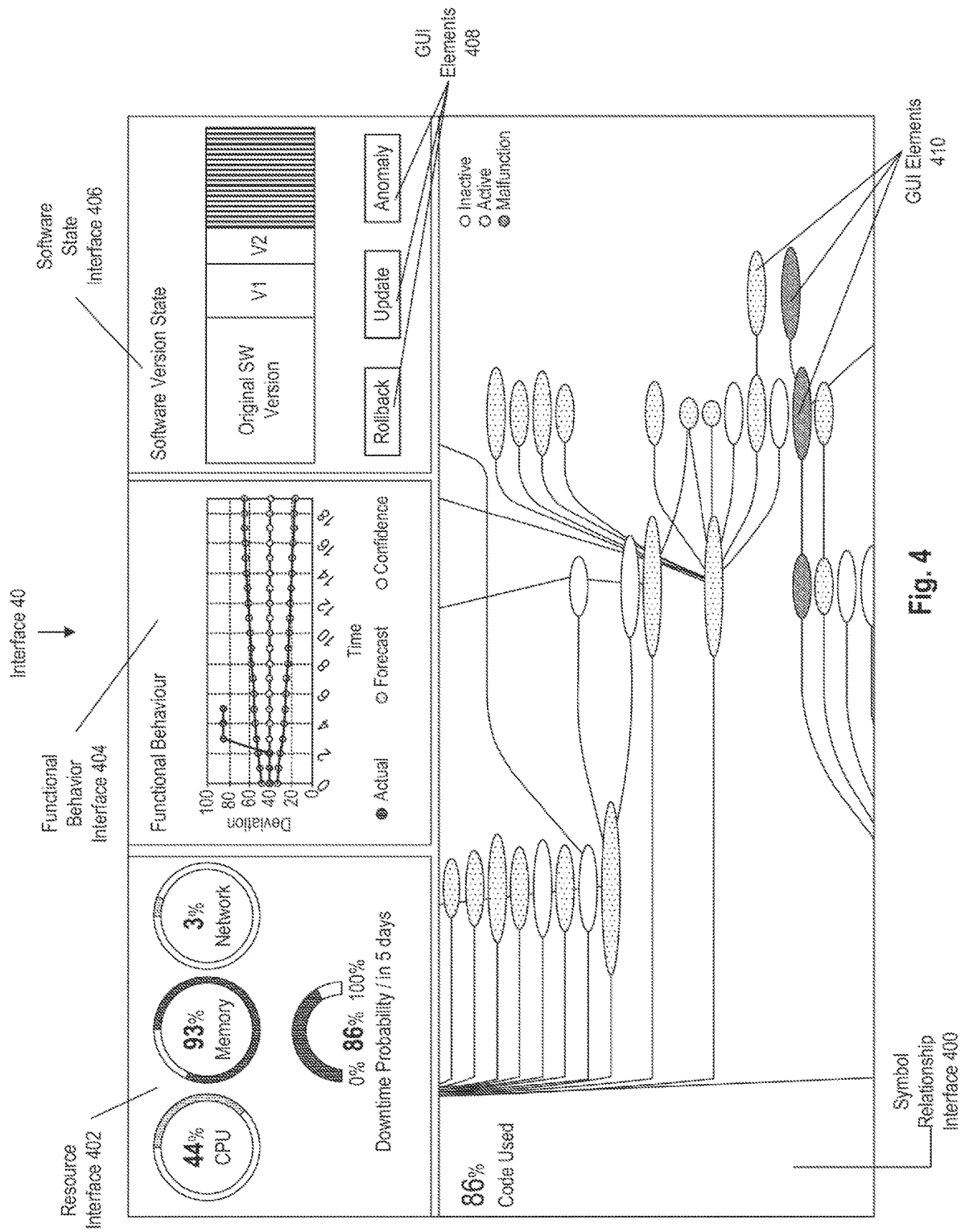
FIG. 4 illustrates an exemplary pictographic representation of an interface for analyzing code behavior, consistent with embodiments of the present disclosure.

FIG. 4 illustrates an exemplary pictographic representation of an interface 40 for analyzing code behavior, which may be displayed at, for example, display 134. Interface 40 may be displayed according to a program on a device, such as a program on user device 128 or one of programs 126. The visual depictions displayed by interface 40 may be based on a process, such as those discussed with respect to FIGS. 6-14. In some embodiments, a visual depiction displayed on interface 40 may relate to a particular controller, type of controller, system, type of system, code portion, and/or line-of-code behavior and relation model. Interface 40 may display information statically (e.g., using a fixed input, such as data from a controller) or dynamically (e.g., using an input changing in real-time, such as real-time data from a controller). In some embodiments, a user may be able to change statically displayed information by selecting a different fixed input. For example, interface 40 may display a slider bar, along which a user may move a slider to select a point in time that corresponds to a particular input, such as data related to the behavior of a controller at a particular point in time. In some embodiments, an input may cause interface 40 to animate a sequence of frames showing a change in controller operation over time. A user, for example a user of user device 128, may interact with interface 40 using communication interface 132.

Interface 40 may include a symbol relationship interface 400, which may visually depict symbol relationships, which may be represented by a line-of-code behavior and relation model 30, as discussed above. In some embodiments, symbol relationship interface 400 may display graphical user interface (GUI) elements 410. GUI elements 410 may represent symbols, such as those discussed with respect to FIG. 3, among others. In some embodiments, symbol relationship interface 400 may display symbol relationships between GUI elements 410, as indicated by the exemplary black lines connecting these elements in the figure. In some embodiments, a GUI element 410 and/or symbol relationships may have a combination of any of: a color, text, animation, shading, shape, position, size, a pictorial element (e.g., a red X mark), or any other visual aspect capable of conveying information to a user viewing interface 40. For example, as shown in FIG. 4, GUI elements 410 have varying types of shading, which may indicate that a symbol associated with a particular GUI element 410 is inactive, active, or malfunctioning. In some embodiments, symbol relationship interface 400 may display information related to code underlying the symbols and/or symbol relationships, such as a percent of code used. The information in symbol relationship interface 400 may be displayed statically or dynamically, as discussed above.

Interface 40 may include other interfaces, such as resource interface 402, functional behavior interface 404, and software state interface 406. Resource interface 402 may depict current, past, or future resource usage associated with a device and/or system. For example, resource interface 402 may depict a current usage of CPU, memory, and/or network bandwidth. In some embodiments, resource interface 402 may depict statistical information related to resource usage, such an average level of CPU usage or a historical variance in network bandwidth usage. In some embodiments, resource interface 402 may depict data derived from resource usage and/or other information, which may be predictive. For example, resource interface 402 may depict a probability of downtime of a device, system, etc. (e.g., as shown in FIG. 4). The information in resource interface 402 may be displayed statically or dynamically, as discussed above.

Interface 40 may include a functional behavior interface 404, which may depict functional behavior associated with symbols and/or symbol relationships depicted in symbol relationship interface 400. In some embodiments, functional behavior interface 404 may depict a change in functional behavior over time, which may be shown in a variety of ways, including by a line graph (e.g., as shown in FIG. 4 with lines forming an operational envelope as "forecast"), a bar graph, a dynamically colored element (e.g., with a strength of a chromatic trait indicating further deviation of behavior from an expected envelope), any combination of these, and/or any visual indicator that can change over time. The information in functional behavior interface 404 may be displayed statically or dynamically, as discussed above.

Interface 40 may also include a software state interface 406, which may include GUI elements 408. In some embodiments, software state interface 406 may depict a current state of software, which may be represented in symbol relationship interface 400 and/or associated with code on a device (e.g., controller). For example, software state interface 406 may depict original software installed on a controller and any number of subsequent changes to that software. Such changes may be part of a configuration management process and may include, but are not limited to, updates, rollbacks, deletions, additions, recalibration, parameter alterations, and/or any other change to software for a device. GUI elements 408, which may be included in software state interface 406, may, upon receiving an input, cause a change to visual depictions in interface 40, to code, and/or to a line-of-code behavior and relation model. For example, a GUI element 408, upon receiving an input, may change code and/or a corresponding line-of-code behavior and relation model to an updated version. User interactions with visual depictions, which may be displayed on interface 40, are discussed further with respect to FIG. 14, among others. The information in software state interface 406 may be displayed statically or dynamically, as discussed above.

Figure 5:
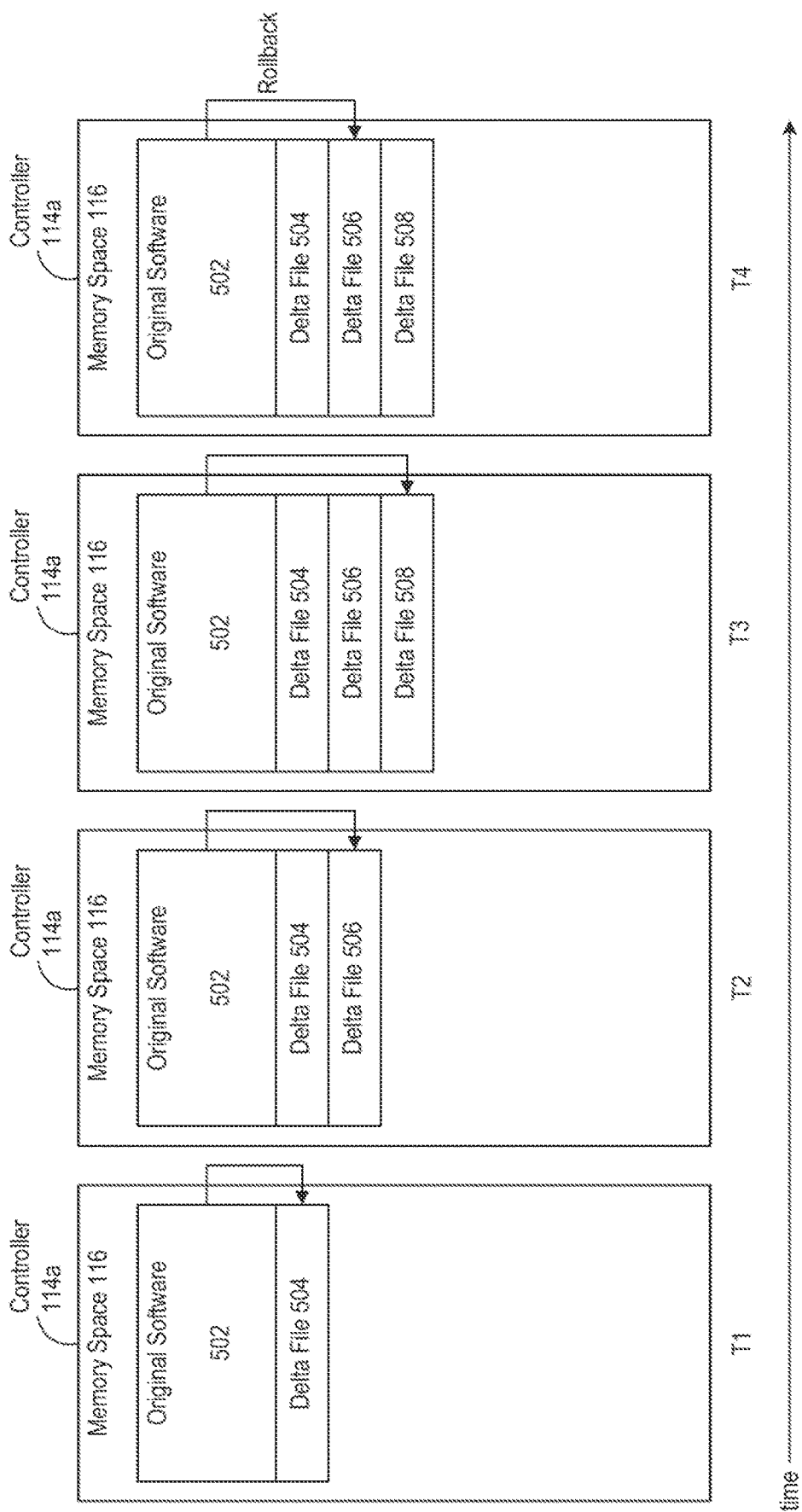
FIG. 5 illustrates an exemplary pictographic representation of delta file software changes on a controller, consistent with embodiments of the present disclosure.

FIG. 5 illustrates an exemplary pictographic representation of delta file software changes on controller 114a. Software on a controller (e.g., original software 502) may change over time, which may be accomplished through storing a delta file (e.g., delta file 504) in memory space 116. At different times, different delta files may be stored or removed from memory space 116, and/or different delta files may be currently implemented by software on controller 114a. For example, at a time T1, delta file 504 may be stored in memory space 116, and may be currently implemented by original software 502 (as shown by an arrow in FIG. 5). At another point in time, T3, delta file 508 (e.g., a software update, which may be part of a configuration management process) may be stored in memory space 116, and may be currently implemented by original software 502 (as shown by an arrow in FIG. 5). At yet another point in time, T4, software on controller 114a may change from implementing delta file 508 to implementing a previous delta file 506 (e.g., a rollback).

A combination of software (e.g., original software 502) and any number of delta files (including zero delta files) may be modeled by a line-of-code behavior and relation model. In some embodiments, memory space 116 may also store a line-of-code behavior and relation model and/or unique identifier, either or both of which may be associated with original software 502 and/or a delta file (e.g., delta file 504). In these embodiments, a line-of-code behavior and relation model and/or unique identifier may be part of a delta file itself.

Figure 6:
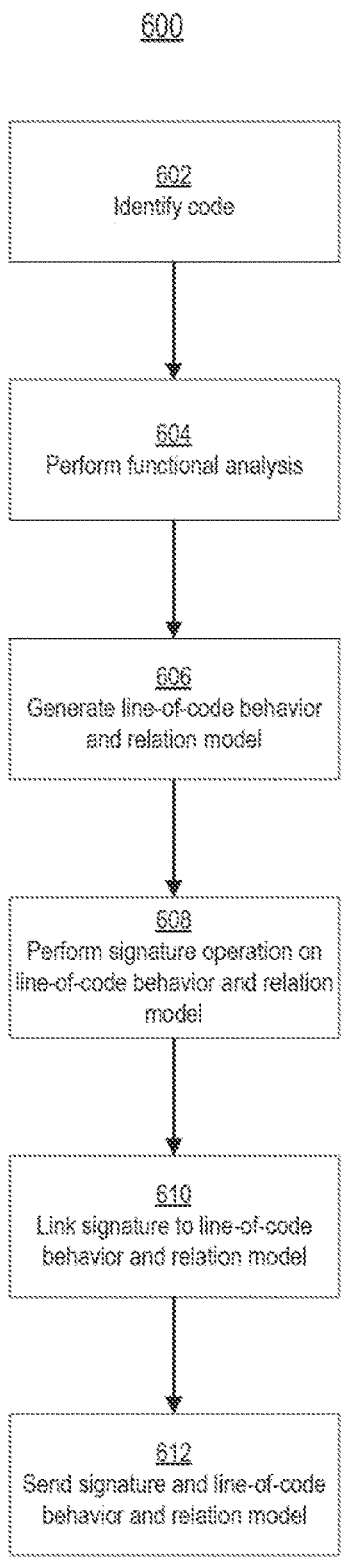
FIG. 6 depicts a flowchart of an exemplary process for generating and signing line-of-code behavior and relation models, consistent with embodiments of the present disclosure.

FIG. 6 shows an exemplary process 600 for generating and signing line-of-code behavior and relation models. In accordance with above embodiments, process 600 may be implemented in system 10 depicted in FIG. 1, or any type of IoT network environment. For example, process 600 may be performed by a processor (e.g., processor 136) and/or other components of security provider 102 (e.g., database 130), or by any computing device or IoT system.

At step 602, process 600 may identify code, which may be executable code, which may be configured for execution on a physical controller (e.g., an ECU of a vehicle, an IoT controller, etc.). In some embodiments, process 600 may identify code configured for execution or other implementation on a virtual controller, execution on a personal computing device, and/or code that is not configured to execute. In some embodiments, the executable code may include, as an example, a software change (e.g., update, patch, rollback, deletion, alteration, recalibration, parameter alteration, etc.) delta file. In some embodiments, the code may be identified when it is received at a device (e.g., user device 128), for example when the code is entered at user device 128 by a user, or when it is received having been sent from another device (e.g., controller 114a).

At step 604, process 600 may perform a functional analysis of code, such as the code received at step 602, which may determine a number of functions associated with the code and/or a number of relationships between the number of functions. In some embodiments, performing a functional analysis may involve parsing the received code for known segments (e.g., functions, variables, etc. with determined functional effects) and/or unknown segments. In some embodiments, unknown segments may have functional effects classified by a user (e.g., through an input at security provider 102, which may update information in database 130). In some embodiments, the functional analysis may involve simulating the code in a physical or virtual computing environment to determine functional effects). In some embodiments, the code may be split according to the functional effects of segments and/or functional relationships between segments.

At step 606, process 600 may generate a line-of-code behavior and relation model, which may be an instance of a line-of-code behavior and relation model 30, discussed above. In some embodiments, the line-of-code behavior and relation model may be generated based on any number of the functions and relationships determined by the functional analysis at step 604. In some embodiments, the line-of-code behavior and relation model may be generated through a machine learning process, which may include a statistical classification process, a dynamic analysis process, determining a sequence of functions associated with a segment or segments of code, and/or determining a relationship between at least two of the functions of the sequence.

At step 608, process 600 may perform a signature operation on the generated line-of-code behavior and relation model. A signature operation may include a hash operation, cryptographic function, and/or any signing algorithm. For example, the signature may be generated according to algorithms such as SHA-256, MD6, Fast-Hash, universal one-way hash function, or others. The signature operation may produce a unique signature value associated with the line-of-code behavior and relation model, symbol, controller, and/or system. In some embodiments, the unique signature value may include a hash value and/or a cryptographic nonce number. In some embodiments, the signature operation may be based on a number of the symbols associated with a segment or segments of code, a type of at least one of the symbols, a number of the relationships in a line-of-code behavior and relation model, a configuration of the relationships in a line-of-code behavior and relation model, a number of symbols associated with at least one relationship, and/or any other characteristic of a line-of-code behavior and relation model.

At step 610, process 600 may link a unique signature value (e.g., the value generated at step 608) to a line-of-code behavior and relation model (the line-of-code behavior and relation model generated at step 606, or a pre-existing line-of-code behavior and relation model, etc.). Linking the unique signature value may include generating a file having both the unique signature value and line-of-code behavior and relation model, writing the unique signature value to the field of the line-of-code behavior and relation model, embedding the unique signature value to the line-of-code behavior and relation model, and/or making a notation in data to indicate that the unique signature value is associated with the line-of-code behavior and relation model. In some embodiments, process 600 may assign the unique signature value to a segment or segments of code (e.g., a delta file), which the line-of-code behavior and relation model may be associated with (e.g., when the line-of-code behavior and relation model was generated based on the segment or segments of code). In some embodiments, linking the unique signature value to the line-of-code behavior and relation model may include compressing the line-of-code behavior and relation model, which may occur at any point in the linking process (e.g., at the end). In some embodiments, process 600 may send the line-of-code behavior and relation model with the assigned signature value to a remote device (e.g., a controller 114a), which may occur before or after step 610.

Figure 7:
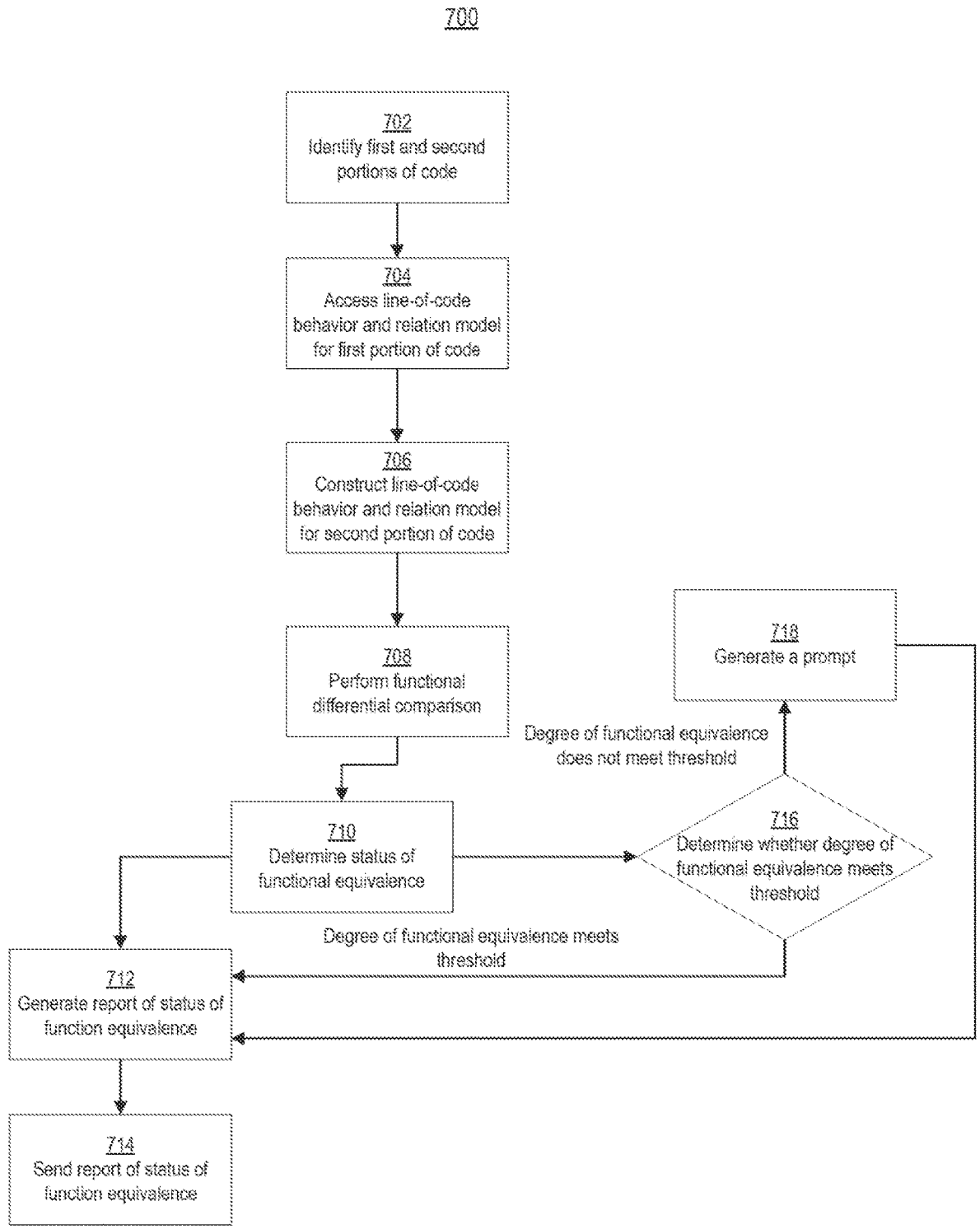
FIG. 7 depicts a flowchart of an exemplary process for using a line-of-code behavior and relation model to determine software functionality changes, consistent with embodiments of the present disclosure.

FIG. 7 depicts an exemplary process 700 for generating and signing line-of-code behavior and relation models. In accordance with above embodiments, process 700 may be implemented in system 10 depicted in FIG. 1, or any type of IoT network environment. For example, process 700 may be performed by a processor (e.g., processor 136) and/or other components of security provider 102 (e.g., database 130), or by a computing device or IoT system.

At step 702, process 700 may identify a first portion of code and a second portion of code. Either or both the first and second portions of code may be executable code, which may be for implementation or execution on a physical controller (e.g., an ECU, which may be of a vehicle), a virtual controller, a personal computing device, and/or may be code that is not configured to execute. For example, at least one of the execution of functions of the first portion of code or the execution of functions of the second portion of code may be an execution on a physical or virtualized controller. In some embodiments, the first portion of code may correspond to software that may be currently deployed and/or running on a device, or of an earlier version than the second portion of code. Further, the second portion of code may correspond to a software change (e.g., a recalibration), which may be intended for a device currently having the first portion of code. Identifying the first and/or second portions of code may include generating the first and/or second portions of code, receiving the first and/or second portions of code, and/or retrieving the first and/or second portions of code from a storage medium (e.g., memory space 116, a storage medium of remote system 103, memory 138, database 130, etc.).

At step 704, process 700 may access a first line-of-code behavior and relation model, which may represent execution of functions of the first portion of code. This model may be stored on a storage device (e.g., database 130) accessible to a device performing process 700 (e.g., user device 128). In some embodiments, the first line-of-code behavior and relation model may be an instance of a line-of-code behavior and relation model 30, discussed above. For example, the first line-of-code behavior and relation model may be a line-of-code behavior and relation model 30 that models symbols and symbol relationships associated with the first portion of code. In some embodiments, the accessed line-of-code behavior and relation model may have been generated according to a machine learning process, consistent with other disclosed embodiments.

At step 706, process 700 may construct, based on the second portion of executable code, a second line-of-code behavior and relation model, which may represent execution of functions of the second portion of code. In some embodiments, the first line-of-code behavior and relation model may be a line-of-code behavior and relation model 30, which may model symbols and symbol relationships associated with the second portion of code. In some embodiments, process 700 may link at least one function of the second portion of code to at least one segment of the second portion of code.

In some embodiments, at least one of the first or second line-of-code behavior and relation models may have been generated dynamically (e.g., generated using real-time data received from a device operating using the first or second portions of code). For example, a security provider 102 may receive real-time operation information from a controller and/or controller system. Such dynamic generation may be performed using steps discussed with respect to FIG. 13, among others. In other embodiments, the first or second line-of-code behavior and relation model may have been generated statically (e.g., using pre-existing code not based on real-time operations).

At step 708, process 700 may perform a functional differential comparison of the first line-of-code behavior and relation model to the second line-of-code behavior and relation model. In some embodiments, performing the functional differential comparison may involve comparing all of or portions of line-of-code behavior and relation models, which may be associated with the first and second line-of-code behavior and relation models. In addition to or instead of comparing line-of-code behavior and relation models 30, process 700 may compare unique identifiers or other identifying information associated with the first line-of-code behavior and relation model and the second line-of-code behavior and relation model, respectively. In some embodiments, the functional differential comparison may include determining whether functionality of the first portion of executable code falls within an operational envelope related to at least one of: a CPU cycle, a memory requirement, speed of execution, or a functionality relationship. In some embodiments, the functional differential comparison may be based on at least one of a difference of (e.g., between the first and second line-of-code behavior and relation models): response time, sequence of function execution, or memory leakage. Response time may be determined based on, for example, a measured time for a processor to respond to a message (e.g., request for response, ping, or real-time message). A sequence of function execution may be represented by a stored sequence, average of prior function sequences, or machine learning process that determines an expected function sequence. Memory leakage may be indicated, for example, as memory contents that should not be deleted from memory but are deleted, or memory contents that should be deleted but are not deleted.

In some embodiments, process 700 may determine that a third portion of code is dormant (e.g., performing minimal actions, not used at all, obsolete, redundant, inefficient, part of a previous software change, etc.). This determination may be triggered based on the functional differential comparison of step 708.

At step 710, process 700 may determine a status of functional equivalence, which may include a status of functional equivalence between the first and second line-of-code behavior and relation models. In some embodiments, a status of functional equivalence may include a status of equivalent or not equivalent and/or a degree of equivalence, which may be used at step 716. A status of functional equivalence may be based on a comparison performed at step 708. For example, a comparison at step 708 may yield a degree of functional equivalence between the first and second line-of-code behavior and relation models, which may be expressed in a variety of ways. As a further example, such a degree of functional equivalence may include a percentage of equivalence (e.g., 75% equivalent), determinations of equivalence of particular portions of the first and second line-of-code behavior and relation models (e.g., 99% of symbols between the models are equivalent, symbol "X–1" in the first model is only 80% equivalent to a modified symbol "X–1" in the second model, etc.). In some scenarios, process 700 may proceed to step 712 directly from step 710, for example if a status of equivalent is determined at step 710. Process 700 may, in some cases, proceed to step 716 and/or step 718 after performing step 710.

At step 712, process 700 may generate a report of a status of functional equivalence, which may include a status determined at step 710, a degree of functional equivalence, or any other information related to functional similarity or difference between the first and second line-of-code behavior and relation models.

At step 714, process 700 may send a report of a status of functional equivalence, which may include a report generated at step 712. In some embodiments, the report may identify at least one instance of functionality drift, which may have been determined at, for example, step 708 or 710. In some embodiments, this report may be sent from a device performing process 700 (e.g., user device 128) to a separate device (e.g., network resource 104a, remote system 103, etc.). In some embodiments, the separate device may be a device associated with the first and/or second line-of-code behavior and relation models (e.g., a device that provided code underlying the first and/or second models, a device of a provider of code underlying the first and/or second models, a device of a manufacturer of a component, device, or system for which the first and/or second portions of code are intended).

At step 716, process 700 may determine whether a degree of functional equivalence (e.g., a degree of functional equivalence determined at step 710) meets a threshold. The nature of the threshold may take on a variety of forms, including a percentage equivalence between the first and second line-of-code behavior and relation models, a percentage equivalence between certain portions of the first and second line-of-code behavior and relation models (e.g., between critical portions of code within the first and second portions), or any other quantification of equivalence between the first and second portions of code or between the first and second line-of-code behavior and relation models. In some embodiments, for example when a result of the functional differential comparison exceeds a threshold, process 700 may determine, based on a determined difference, an estimated probability of downtime (e.g., of a device for which the second portion of code is intended), which may be expressed as a probability of downtime in a defined time period.

In some embodiments, the threshold may have been set at system 100 or remote system 103. For example, in some implementations a set of regulations or specifications may determine the threshold for allowed differences in code functionality. One example may be the Type Approval rules issued by the United Nations Economic Commission for Europe. These rules may, for example, specify thresholds for software functionality deviations that are permitted for over-the-air software changes (updates, rollbacks, alterations, etc.). In some situations, the threshold may be 0% (i.e., no deviation in functionality is permitted for an over-the-air change), while in other situations the threshold may be higher. Similar regulations and rules may determine when IoT controllers (e.g., electronics controllers, industrial controllers, mechanical device controllers, appliance controllers, etc.) are permitted to receive over-the-air software changes. In this manner, the disclosed techniques are able to comply with government or industry regulations in an efficient and secure manner, allowing for permitted over-the-air changes and not impermissible changes that entail significant functional differences. The determined degree of functional equivalence may dictate further steps taken by process 700. For example, if the determined degree of functional equivalence meets the threshold, process 700 may proceed to step 712; if the determined degree of functional equivalence does not meet the threshold, process 700 may proceed to step 718.

At step 718, process 700 may generate a prompt, which may be based on a determination made at step 710 and/or step 716. In some embodiments, the prompt may include a warning, a degree of functional equivalence, or any other information determined as part of process 700. In some embodiments, a prompt may tag the second portion of code, the second line-of-code behavior and relation model, and/or unique identifier. Tagging may include labeling code, a model, and/or an identifier as unusable, malicious, bugged, or otherwise inappropriate for use on a device. In some embodiments, tagging may involve disabling code and/or sending a notification to a device to not permit execution of the code.

Figure 8:
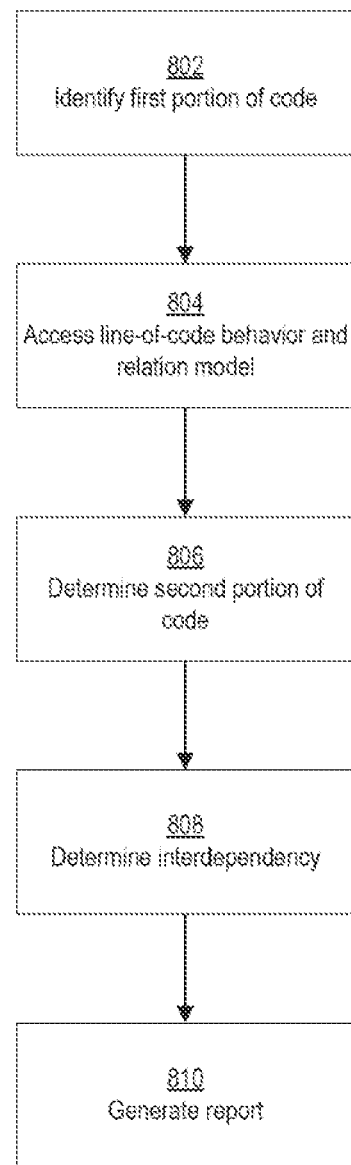
FIG. 8 depicts a flowchart of an exemplary process for identifying software interdependencies based on functional line-of-code behavior and relation models, consistent with embodiments of the present disclosure.

FIG. 8 depicts an exemplary process 800 for identifying software interdependencies based on functional line-of-code behavior and relation models. In accordance with above embodiments, process 800 may be implemented in system 10 depicted in FIG. 1, or any type of IoT network environment. For example, process 800 may be performed by a processor (e.g., processor 136) and/or other components of security provider 102 (e.g., database 130), or by a computing device or IoT system.

At step 802, process 800 may identify a first portion of code, which may be associated with a controller. For example, the first portion of code may be configured to implement or execute on a physical controller (e.g., ECU), a virtual controller, a personal computing device, and/or may not be configured to execute. In some embodiments, the first portion of code may correspond to software that may be currently deployed and/or running on a device (e.g., controller), or may correspond to a software change (e.g., an update, fix, patch, alteration, deletion, recalibration, parameter alteration etc., any of which may be part of a configuration management process). In some embodiments, the first portion of code may be associated with a sensitivity value, which may be a value describing the criticality of the first portion of code to a device and/or system to which it relates. As such, a sensitivity value may be based on the frequency with which the first portion of code is used when software including the first portion of code is executed on a device, a level of importance of a device with which the first portion is associated to a system overall (e.g., an ECU controlling a braking function may have a higher level of importance than an ECU controlling an air conditioning fan speed), a number of dependencies or interdependencies that the first portion of code has, or any other measure of a degree of involvement the first portion of code has with a device and/or system. While the first portion of code is discussed here as being associated with a first sensitivity value, other portions of code, symbols, and/or individual devices (e.g., controllers) may also be associated with sensitivity values, as is discussed further with respect to other embodiments. Identifying the first portion of code may include generating the first portion of code, receiving the first portion of code, and/or retrieving the first portion of code from a storage medium (e.g., memory space 116, a storage medium of remote system 103, memory 138, database 130, etc.).

At step 804, process 800 may access a functional line-of-code behavior and relation model, which may represent functionality of a portion of code (e.g., the portion of code identified at step 802). In some embodiments, the accessed functional line-of-code behavior and relation model may be a be a line-of-code behavior and relation model 30, and may model symbols and symbol relationships associated with the first portion of code. In some embodiments, accessing the functional line-of-code behavior and relation model may include generating the functional line-of-code behavior and relation model, receiving the functional line-of-code behavior and relation model, and/or retrieving the functional line-of-code behavior and relation model from a storage medium (e.g., memory space 116, a storage medium of remote system 103, memory 138, database 130, etc.).

At step 806, process 800 may determine a second portion of code, which may include a software change (e.g., update) for a controller. For example, as with the first portion of code, the second portion of code may be configured to implement or execute on a physical controller (e.g., ECU), a virtual controller, a personal computing device, and/or may not be configured to execute. In some embodiments, a sensitivity value is associated with the second portion of code (such as a sensitivity value discussed at step 802). In some embodiments, the second portion of code may be associated with the same device (e.g., controller) as the first portion of code. In some embodiments, the first portion of code may be associated with a first controller and the second portion of code may be associated with a second controller, and both the first and second controllers may be part of the same device or system (e.g., at least a portion of a vehicle, building, network, etc.). Determining the second portion of code may include generating the second portion of code, receiving the second portion of code (e.g., from a remote system 103), and/or retrieving the second portion of code from a storage medium (e.g., memory space 116, a storage medium of remote system 103, memory 138, database 130, etc.).

At step 808, process 800 may determine an interdependency. For example, process 800 may determine that the second portion of code is interdependent with the first portion of code. In some embodiments, the first and second portions of code may be associated with the same device (e.g., controller), such that the interdependency is internal to the device. In some embodiments, this determination may be based on a functional line-of-code behavior and relation model (e.g., the model accessed at step 804, a model associated with the first portion of code, a model associated with the second portion of code, etc.). The interdependency may be determined by comparing symbols or symbol relationships of two different line-of-code behavior and relation models.

In some embodiments, determining an interdependency may include determining a functional impact of the first portion of code on the second portion of code. For example, process 800 may determine a status and/or change in functionality associated with interdependent portions of code (e.g., according to process 700, or other processes discussed herein). By way of example, a change to one portion of code may result in functional changes at other portions of code (e.g., related to the same device), and process 800 may determine the nature (e.g., degree of functional equivalency) of each functional change at the other portions, to the extent there are any. Process 800 may also determine a type of interdependency (e.g., a uni-directional interdependency, a bi-directional interdependency, an interdependency impacting a critical portion of code, an interdependency impacting a non-critical portion of code, etc.) and/or a strength of interdependency (e.g., a number of symbols affected, a frequency of impact to a symbol, a potential or actual amount of change to a symbol, etc.). In some embodiments, the functional impact may be based on a sensitivity value associated with the first portion of code (i.e., a first sensitivity value) and a sensitivity value associated with the second portion code (i.e., a second sensitivity value). In some embodiments, process 800 may determine that the functional impact exceeds a threshold. As discussed above, the threshold may be dynamically set (e.g., based on a machine learning process), or statically set (e.g., manually set, or set based on a government regulation defining a permitted degree of functional difference).

In some embodiments, process 800 may identify a first signature uniquely identifying the first portion of code and a second signature uniquely identifying the second portion of code. Process 800 may link the signatures together (e.g., in a cross-reference or lookup table), which may describe interdependencies in a useful compact format.

At step 810, process 800 may generate a report. In some embodiments the report may be based on the determined interdependency and/or may identify interdependent portions of code (e.g., the first and second portions of code of steps 802 and 806). The report may identify a type and/or strength of interdependency (e.g., as discussed with respect to step 808). The report may include a functional impact, such as a functional impact determined at step 808.

In some embodiments, process 800 may generate a visual depiction of the determined interdependency. For example, a visual depiction may show an interdependency in a graphical representation of two line-of-code behavior and relation models. In some embodiments the visual depiction may be the same as or similar to that shown in symbol relationship interface 400. The visual depiction may include a visual element of the determined interdependency, a visual element of the first portion of code, a visual element of the second portion of code, and/or visual elements of other portions of code. In some embodiments, the visual depiction may be based on the determination that the functional impact exceeds the threshold (e.g., the visual depiction may indicate the degree to which the functional impact exceeds the threshold, the visual depiction may only display if the function impact exceeds the threshold, etc.).

Figure 9:
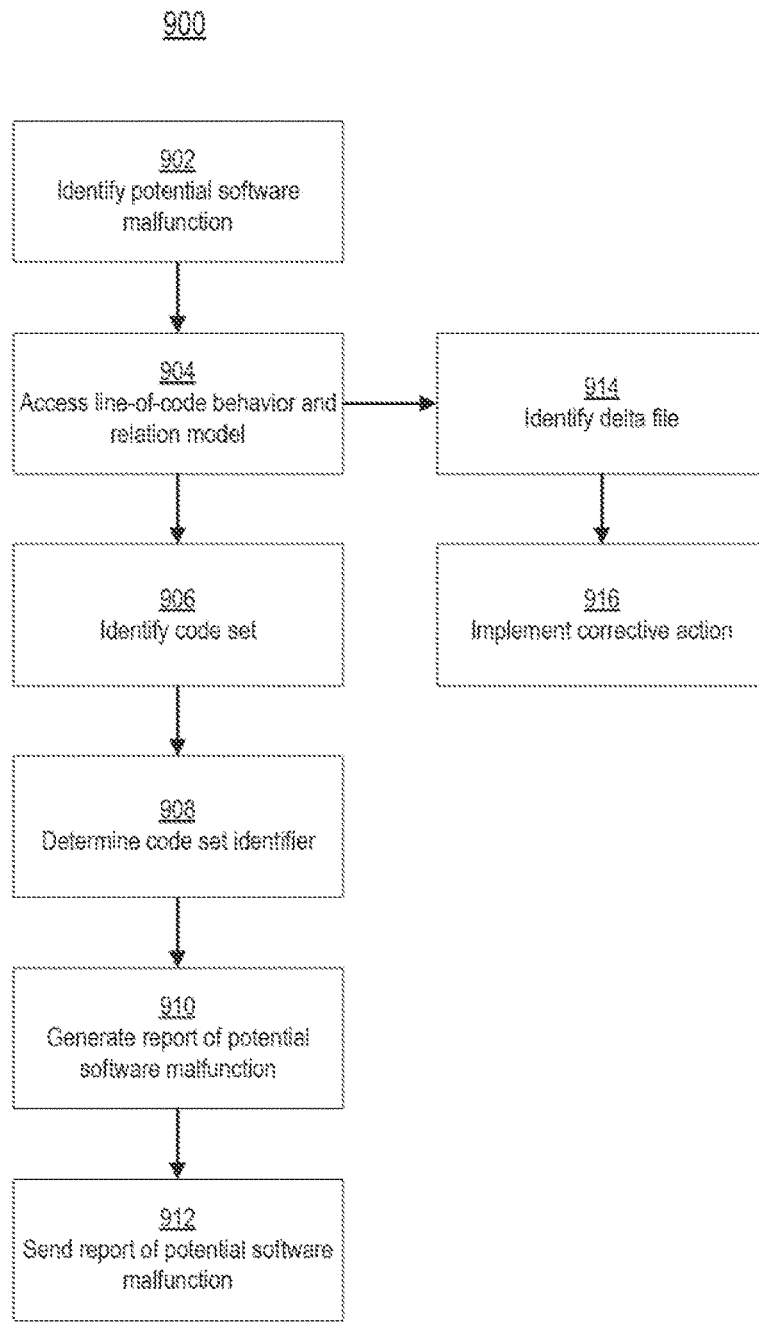
FIG. 9 depicts a flowchart of an exemplary process for identifying sources of software-based malfunctions or errors, consistent with embodiments of the present disclosure.

FIG. 9 depicts an exemplary process 900 for identifying sources of software-based malfunctions or errors. In accordance with above embodiments, process 900 may be implemented in system 10 depicted in FIG. 1, or another type of IoT network environment. For example, process 900 may be performed by a processor (e.g., processor 136) and/or other components of security provider 102 (e.g., database 130), or by a computing device or IoT system.

At step 902, process 900 may identify a potential or actual software malfunction. In some embodiments, the identified potential or actual software malfunction may be associated with (e.g., occurring in) a system, which may have multiple code sets associated with a plurality of different software sources (e.g., devices, software developers, etc.). For example, the multiple code sets may have been developed by a plurality of different software developers, may be associated with different devices that generated the code sets, may be associated with different geographies, etc. In some embodiments, multiple code sets may be associated with at least one controller (e.g., ECU) of a system (e.g., vehicle). In some embodiments where the multiple code sets are associated with different software developers, each of the plurality of different software developers may have a unique source identifier, and each code set may be associated with one of the unique source identifiers. As with all embodiments discussed herein, a system is not necessarily limited to a physical system, but may instead include a virtual system.

Code sets may also be associated with different functions. For example, one code set may be associated with controlling one operation in a system (e.g., steering in a vehicle), whereas another code set may be associated with controlling a different operation in a system (e.g., blind spot detection). In some embodiments, code sets may be dependent on each other (e.g., as discussed with respect to FIG. 11).

At step 904, process 900 may access a line-of-code behavior and relation model, which may represent execution of functions of the code sets. In some embodiments, the accessed line-of-code behavior and relation model may only represent a single code set. In some embodiments, the line-of-code behavior and relation model may represent execution of functions of the code set identified at step 906. In some embodiments, the accessed line-of-code behavior and relation model may have been generated dynamically based on data associated with real-time operations of at least one device (e.g., controller). After performing step 904, process 900 may proceed with step 906 and/or step 914.

At step 906, process 900 may identify a code set. The code set may be identified based on the line-of-code behavior and relation model, and the code set may be determined to have the potential to cause, or have caused, a least in part, a software malfunction. For example, process 900 may analyze the line-of-code behavior and relation model (e.g., through simulation of operations, using real-time operational data, etc.) to determine a code set or a part of a code set associated with the potential or actual software malfunction.

In some embodiments, multiple code sets may be associated with the potential or actual software malfunction. In these scenarios, the multiple code sets may be interdependent with each other (i.e., if within the same device).

At step 908, process 900 may determine a code set identifier, which may be a source identifier of the identified code set (e.g., an identifier indicating a device or software developer that generated the identified code set, an identifier indicating a device with which the code set is associated, etc.).

At step 910, process 900 may generate a report of the potential or actual software malfunction. A report of the potential or actual software malfunction may include an estimated time of downtime, identifiers of devices and/or systems potentially or actually impacted by the potential or actual software malfunction, a number of devices and/or systems potentially or actually impacted by the potential or actual software malfunction, an indication of the criticality of the malfunction (e.g., based on the types of devices and/or systems affected, the level of impact of the potential or actual software malfunction, etc.).

At step 912, process 900 may send a report of the potential or actual software malfunction to a remote source (e.g., remote system 103), which may be associated with the identified source identifier.

At step 914, process 914 may identify a delta file. This step may be important in some embodiments, such as where the identification of the potential software malfunction (e.g., in a system) may be based on a recent software change to a component (e.g., controller). For example, the identification of the potential software malfunction may result from a software change implemented, or planned to be implemented, on a component using a delta file. In some embodiments, such as those where a delta file is associated with the identified malfunction, a delta file may be associated with a unique identifier, and the unique identifier may be included in the report, which may allow for improved responsive action, such as at step 916.

At step 916, process 900 may implement a responsive action. Such a responsive action may be taken in response to the identified malfunction. For example, process 900 may revert software on a component (e.g., a controller) associated with the identified malfunction by delinking a delta file from current software on the component. Delinking a delta file may involve any number of different actions, including changing a pointer in memory (e.g., memory space 116, such as shown in FIG. 5), deleting a delta file, changing a unique identifier associated with a delta file, sending a software change to a controller, and/or executing an action at a controller such that it implements a version of software without implementing the delinked delta file. A variety of other responsive actions may be taken, such as sending a notification to a remote device (e.g., an infotainment screen in a vehicle of a controller associated with the delta file, generating and/or sending a report as discussed with respect to steps 910 and 912, etc.), halting an operation on a component, reverting software on components dependent on the component with which the identified malfunction is associated, halting an operation on a dependent controller, etc.

Figure 10:
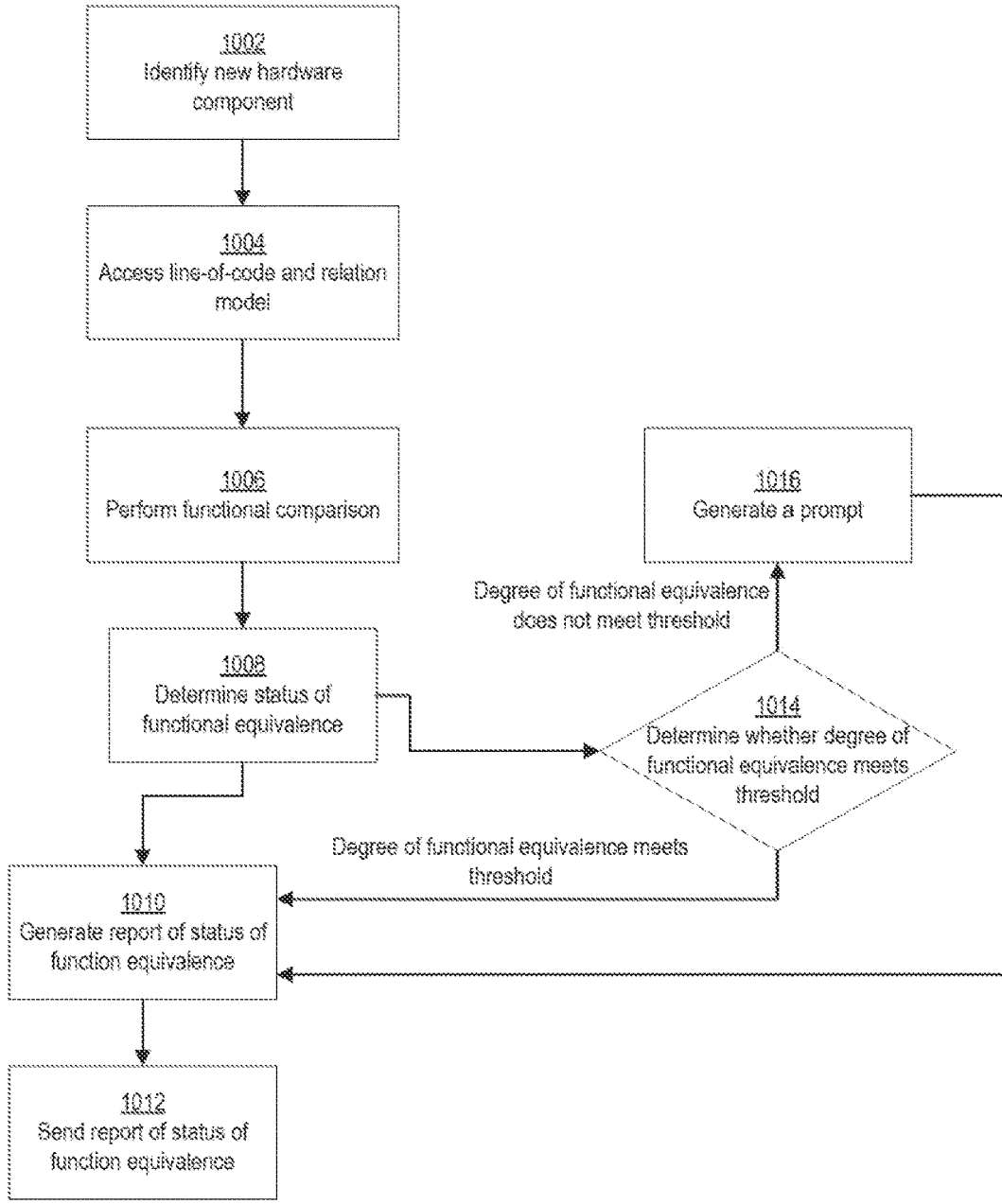
FIG. 10 depicts a flowchart of an exemplary process for analyzing hardware change impacts based on a functional line-of-code behavior and relation model, consistent with embodiments of the present disclosure.

FIG. 10 depicts an exemplary process 1000 for analyzing hardware change impacts based on a functional line of code behavior and relation model. In accordance with above embodiments, process 1000 may be implemented in system 10 depicted in FIG. 1, or any type of IoT network environment. For example, process 1000 may be performed by a processor (e.g., processor 136) and/or other components of security provider 102 (e.g., database 130), or by any computing device or IoT system. In some embodiments, process 1000 may be initiated when a system determines that a new hardware component is operating or attempting to operate in the system.

At step 1002, process 1000 may identify a new hardware component, which may be associated with (e.g., be a part of) a system. In some embodiments, the new hardware component may be a controller, and in even more specific embodiments, the new hardware component may be an ECU in a vehicle (i.e., a system). In some embodiments, the new hardware component may be configured, selected, prepared, etc. to replace a previous hardware component.

At step 1004, process 1000 may access a first line-of-code behavior and relation model, which may represent execution of functions in a system using the new hardware component. The first line-of-code behavior and relation model may have been generated based on data associated with simulated operations of the new hardware component. In some embodiments, process 1000 may also access a second line-of-code behavior and relation model, which may represent execution of functions on a previous hardware component of the system. The second line-of-code behavior and relation model may have been generated dynamically based on data associated with real-time operations of the previous hardware component.

In some embodiments, accessing the functional line-of-code behavior and relation model may include generating the functional line-of-code behavior and relation model, receiving the functional line-of-code behavior and relation model, and/or retrieving the functional line-of-code behavior and relation model from a storage medium (e.g., memory space 116, a storage medium of remote system 103, memory 138, database 130, etc.).

At step 1006, process 1000 may perform a functional differential comparison, which may include a comparison of the first line-of-code behavior and relation model with the second line-of-code behavior and relation model.

At step 1008, process 1000 may determine a status of functional equivalence, which may be based on the functional differential comparison performed at step 1006. In some embodiments, a status of functional equivalence may include a status of functional equivalence between the new hardware component and the previous hardware component. In some embodiments, step 1008 may be similar to step 710 in process 700, with either or both of the new and previous hardware components having an associated portion of code and/or line-of-code behavior and relation model. In some embodiments, process 1000 may determine that there is or is not a functional difference between a new hardware component and a previous hardware component (and/or corresponding portion of code and/or line-of-code behavior and relation model).

At step 1010, process 1000 may generate a report of a status of functional equivalence, which may be a report identifying the status of functional equivalence determined at step 1008. In some embodiments, the report may be based on a determined difference between a new hardware component and a previous hardware component (and/or corresponding portion of code and/or line-of-code behavior and relation model), which may have been determined at step 1008.

At step 1012, process 1000 may send a report of a status of functional equivalence, which may include a report generated at step 1012. In some embodiments, the report may identify at least one instance of functionality drift, which may have been determined at, for example, step 1008 or 1010. In some embodiments, this report may be sent from a device performing process 1000 (e.g., user device 128) to a separate device (e.g., network resource 104a, remote system 103, etc.). In some embodiments, the separate device may be associated with the new and/or previous hardware component (and/or corresponding portion of code and/or line-of-code behavior and relation model). For example, the separate device may be associated with a manufacturer of code-writer for the new and/or previous hardware component.

At step 1014, process 1000 may determine whether a degree of functional equivalence (e.g., a degree of functional equivalence determined at step 1008) meets a threshold. The nature of the threshold may take on a variety of forms, including a percentage equivalence between the new and previous hardware components, a percentage equivalence between certain portions of the first and second line-of-code behavior and relation models (e.g., between critical portions of code within the first and second portions) associated with the new and previous hardware components, or any other quantification of equivalence between the new and previous hardware components. As discussed above, the threshold may be static or dynamic in nature.

Process 1000 may also make other determinations, which may be based on the new hardware component. For example, in some embodiments, for example when a result of the functional differential comparison exceeds a threshold, process 1000 may determine, based on a determined difference, an estimated probability of downtime (e.g., of the new hardware component, of a component dependent with the new hardware component, etc.), which may be expressed as a probability of downtime in a defined time period. In some embodiments, such as those where the new hardware component is a controller, process 1000 may also determine that at least one hardware component, which may be another controller, is dependent with the new hardware component. In yet other embodiments, process 1000 may determine that at least one hardware component (e.g., a component within a controller) is interdependent with the new hardware component (e.g., another component of the same controller).

Process 1000 may also take actions when a component is determined to be dependent with the previous hardware component. For example, process 1000 may access a line-of-code behavior and relation model, which may represent execution of functions on at least one dependent hardware component and the previous hardware component. Further, process 1000 may generate a line-of-code behavior and relation model that represents execution of functions on the at least one dependent hardware component and the new hardware component. Whether these two line-of-code behavior and relation models were generated as part of process 1000, process 1000 may perform a functional differential comparison of these two models. And, process 1000 may determine, a change in functional equivalence within the system (e.g., a functional difference identified with respect to the dependent component), which may be based on the functional differential comparison. In some embodiments, process 1000 may generate a report identifying such a change, which may be based on the determined difference.

In some embodiments, such as those where a functional difference is determined, process 1000 may determine that the new hardware component is unauthorized, which may be based on the determined difference (e.g., if the degree of functional equivalence does not meet a threshold).

In some embodiments, the threshold may been set at system 100 or remote system 103. The determined degree of functional equivalence may dictate further steps taken by process 1000. For example, if the determined degree of functional equivalence meets the threshold, process 1000 may proceed to step 1010: if the determined degree of functional equivalence does not meet the threshold, process 1000 may proceed to step 1016. As discussed above, in some embodiments the threshold is static (e.g., defined by a government or industry regulation or rule), while in other embodiments it is dynamic (e.g., based on a machine teaming process).

At step 1016, process 1000 may generate a prompt, which may be based on a determination made at step 1008 and/or step 1014. In some embodiments, the prompt may include a warning, a degree of functional equivalence, or any other information determined as part of process 1000. Process 1000 may block operation of the new hardware component, which may be based on a determination that the new hardware component is unauthorized. For example, a prompt may tag the new hardware component, a portion of code associated with the new hardware component, a second line-of-code behavior and relation model associated with the new hardware component, and/or unique identifier. Tagging may include labeling (e.g., in software) code, a model, the component and/or an identifier as unusable, malicious, bugged, or otherwise inappropriate for use in a system. In some embodiments, tagging may involve disabling code and/or sending a notification to a system to not permit installation of the new component. Other tagging actions may include those discussed with respect to FIG. 7.

Figure 11:
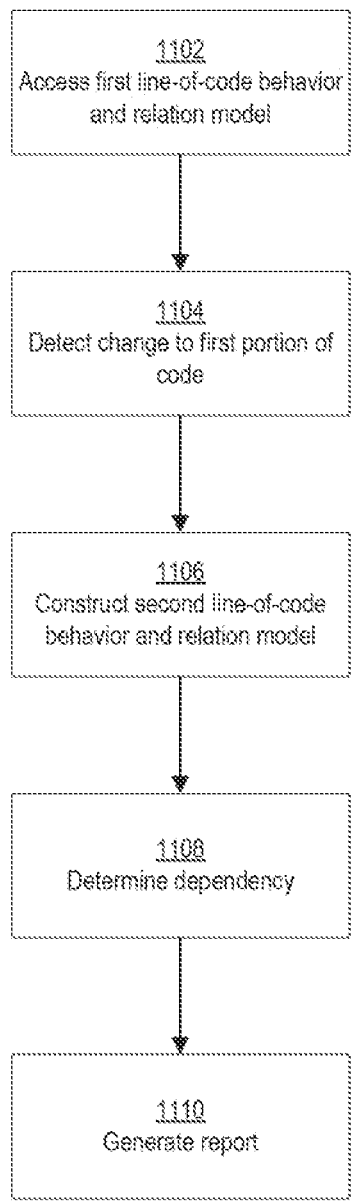
FIG. 11 depicts a flowchart of an exemplary process for identifying software dependencies based on functional line-of-code behavior and relation models, consistent with embodiments of the present disclosure.

FIG. 11 depicts an exemplary process 1100 for identifying software dependencies based on functional line-of-code behavior and relation models. In accordance with above embodiments, process 1100 may be implemented in system 10 depicted in FIG. 1, or any type of IoT network environment. For example, process 1100 may be performed by a processor (e.g., processor 136) and/or other components of security provider 102 (e.g., database 130), or by any computing device or IoT system. In some embodiments, process 1100 may be initiated when a system determines that a new hardware component is operating or attempting to operate in the system.

At step 1102, process 1100 accesses a first line-of-code behavior and relation model, which may represent execution of functions of a first portion of code (e.g., executable code, which may be configured to execute on a controller). In some embodiments, the first portion of code may be associated with a first symbol, which may be at least one of a variable, buffer, function, call, object, and/or segment of code, and may have any other characteristic of a symbol as discussed in other embodiments. The first portion of code may also be associated with a sensitivity value (such as a sensitivity value discussed with respect to FIG. 8, among others).

At step 1104, process 1100 may detect a change to the first portion of code. A change to a portion of code may include code change implemented at a physical controller, a virtual controller, a simulated change made by a user, and/or a code change at any other device.

At step 1106, process 1100 may construct, a second line-of-code behavior and relation model, which may represent execution of functions of the changed first portion of executable code. In some embodiments, the construction of the second line-of-code behavior and relation model may be based on the changed first portion of executable code.

At step 1108, process 1100 may determine a dependency. In some embodiments, this may include a dependency between either the changed first portion of executable code or the first symbol and a second symbol. The second symbol may be at least one of a variable, buffer, function, call, object, and/or segment of code, and may have any other characteristic of a symbol as discussed in other embodiments. The second symbol may also be associated with a sensitivity value (such as a sensitivity value discussed with respect to FIG. 8, among others). In some embodiments, the dependency may be based on the constructed second model. The dependency may also be determined remotely by operating the second line-of-code behavior and relation model remotely from a first and second controller (e.g., controllers associated with the first portion of code and second symbol, respectively). In embodiments where process 1100 concerns at least one controller, such a controller may be part of a group of electronic control units (ECUs) in a vehicle.

Process 1100 may also determine information related to the dependency. For example, process 1100 may determine an impact to the second symbol caused by the changed first portion of code, which may be based on the sensitivity values (e.g., sensitivity values associated with the changed first portion of code and the second symbol). In some embodiments, the dependency may include a strength of association between the first symbol and the second symbol, which may be based on a frequency with which the first symbol interacts with the second symbol, the first portion of executable code being configured to call or modify the second symbol, a number of symbols affected, a frequency of impact to a symbol, a potential or actual amount of change to a symbol, etc. In some embodiments, the second symbol may be associated with a controller (e.g., possibly a second controller, with the first portion of code possibly being associated with a first controller). In some embodiments, process 1100 may determine a status and/or change in functionality associated with interdependent portions of code (e.g., according to process 700, or other processes discussed herein). For example, a change to one portion of code may result in functional changes at other portions of code (e.g., code on other devices), and process 1100 may determine the nature (e.g., degree of functional equivalency) of each functional change at the other portions, to the extent there are any. As an illustrative example, changing the first portion of code for a camera on a vehicle may affect the functioning of a self-parking feature, which may involve other ECUs, such as those controlling steering. In other words, in some embodiments, such as those where a system includes multiple devices, a controller (or other device) whose code did not change may change may still experience a change in functionality based on a change at other device.

At step 1110, process 1100 may generate a report. In some embodiments, the report may be based on the determined difference and/or may identify the dependency. The report may also identify multiple dependencies, for example if steps of process 1100 are performed multiple times. In some embodiments, the report may contain additional information associated with the dependency. For example, in embodiments where process 1100 identifies an impact to the second symbol caused by the changed first portion of code, this impact may be included in the report. Process 1100 may also take other actions related to the determined dependency. For example, process 1100 may generate a visual depiction of the determined dependency, consistent with other embodiments disclosed herein.

Figure 12A:
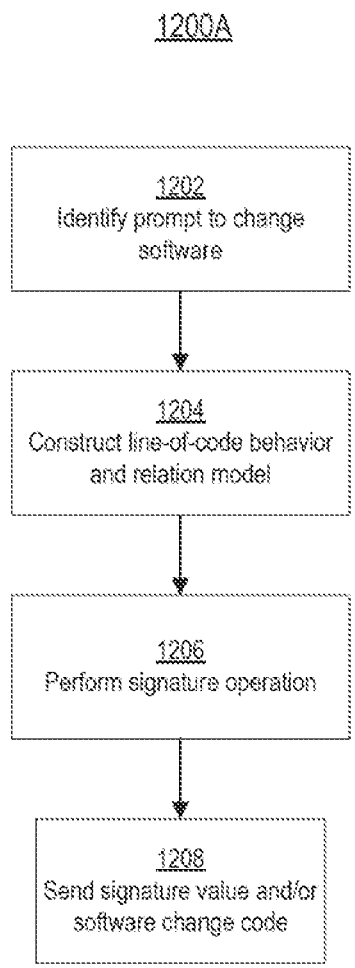
FIG. 12A depicts a flowchart of an exemplary process for managing software delta changes using functional line-of-code behavior and relation models, consistent with embodiments of the present disclosure.

FIG. 12A depicts an exemplary process 1200A for managing software delta changes using functional line-of-code behavior and relation models. In accordance with above embodiments, process 1200A may be implemented in system 10 depicted in FIG. 1, or any type of IoT network environment. For example, process 1100 may be performed by a processor (e.g., processor 136) and/or other components of security provider 102 (e.g., database 130), or by a computing device or IoT system.

At step 1202, process 1200A may identify a prompt to change software, which may include software change code, such as code to change a first version of code on a device (e.g., controller) to a second version of code. In some embodiments, the second version of code may be deployed subsequent to the first version of code (e.g., as an update). In some embodiments, the prompt may include a delta file (e.g., a delta file configured to change software on a controller). In some embodiments, software change code may be configured for execution or other implementation on a virtual controller, execution on a personal computing device, and/or may be code that is not configured to execute. In some embodiments, the prompt may be identified when it is received at a device (e.g., user device 128), for example when the code is entered at user device 128 by a user, or when it is received having been sent from another device (e.g., remote system 103).

At step 1204, process 1200A may construct a line-of-code behavior and relation model, which may be based on the prompt identified at step 1202, and may represent execution of functions of a controller based on a second version of code.

At step 1206, process 1200A may perform a signature operation, which may be performed on the generated line-of-code behavior and relation model, and which may produce a signature value. The signature operation may be similar to those described with respect to FIG. 6 (e.g., the signature operation may include a hash operation, cryptographic function, and/or any signing algorithm), among others. In some embodiments, the signature operation may be based on an identifier of a controller (e.g., a controller associated with the prompt to change software, constructed line-of-code behavior and relation model, etc.). The signature operation may also be based on a type, function, version of software, sensitivity value, age, or processing capacity of the controller.

At step 1208, process 1200A may send the signature value and/or software change code (e.g., from step 1202). In some embodiments, the signature value and/or software change code may be sent to a controller, which may perform process 1200B upon receiving the signature value and/or software change code.

Figure 12B:
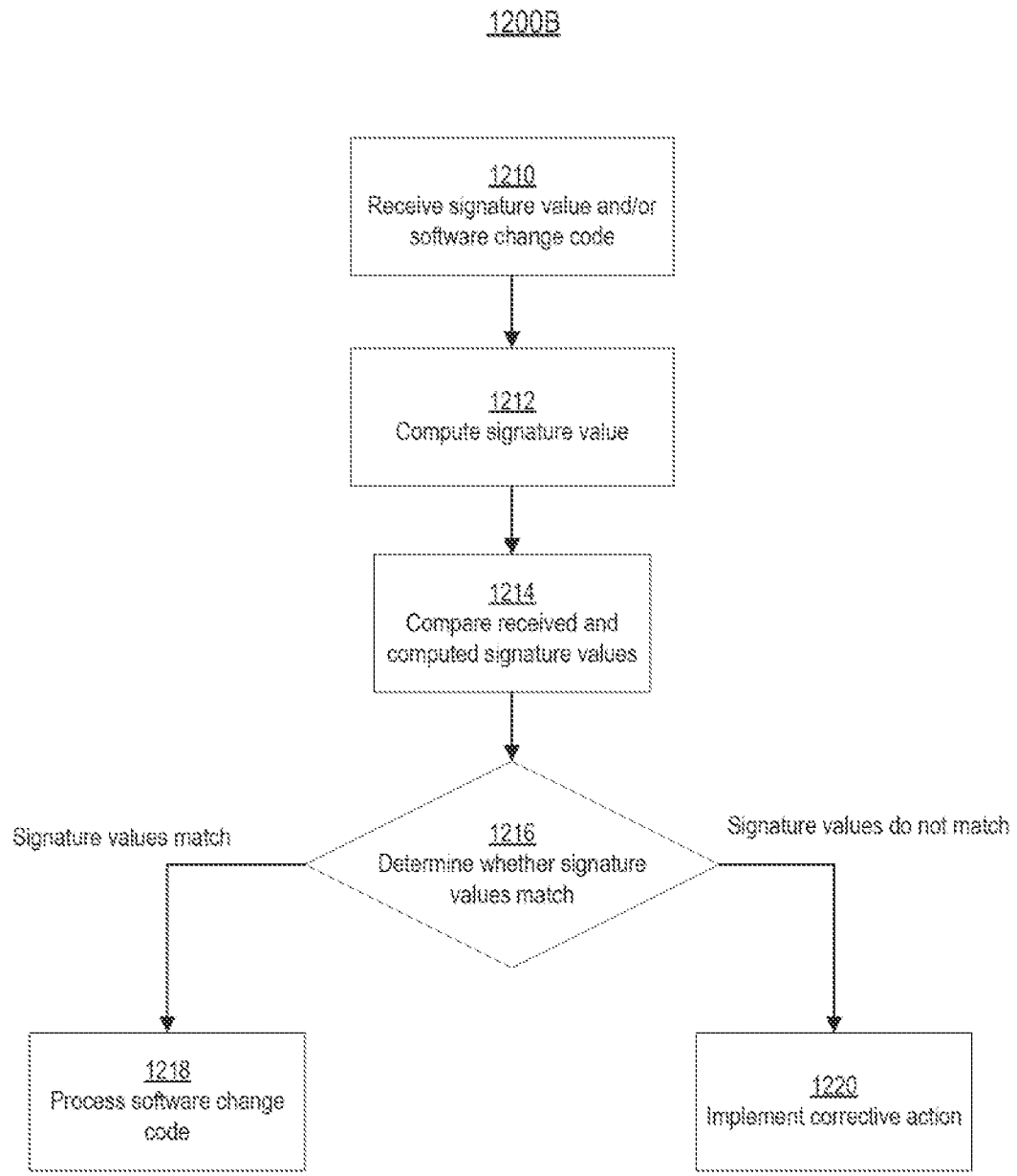
FIG. 12B depicts a flowchart of an exemplary process for analyzing software delta changes based on functional line-of-code behavior and relation models, consistent with embodiments of the present disclosure.

FIG. 12B depicts an exemplary process 1200B for analyzing software delta changes based on functional line-of-code behavior and relation models. In accordance with above embodiments, process 1200A may be implemented in system 10 depicted in FIG. 1, or any type of IoT network environment. For example, process 1100 may be performed by a processor (e.g., processor 118) and/or other components of a controller system (e.g., controller system 108a), or by any computing device or IoT system.

At step 1210, process 1200B may receive a signature value and/or software change code (e.g., sent at step 1208, such as from a security provider 102). For example, the may signature value and/or software change code may be received by a controller (e.g., controller 114a), which may be configured to (i) compare the received signature value to a computed signature value that the controller is configured to compute based on the second version of code and (ii) determine, e.g., based on the comparison, whether to validate the second version of code, as is discussed further with respect to process 1200B.

At step 1212, process 1200B may compute a signature value. As discussed above, the signature may be generated in accordance with a variety of different algorithms. Process 1200B may begin computing a signature value by constructing a line-of-code behavior and relation model, which may be based on the identified prompt and may represent execution of functions of the controller based on a second version of code. Process 1200B may perform a signature operation on the constructed line-of-code behavior and relation model, which may produce a computed signature value. The signature operation may be similar to or the same as those described at step 1206.

At step 1214, process 1200B may compare a received signature value and a computed signature value.

At step 1216, process 1200B may determine whether a received signature value and a computed signature value match, which may be based on a comparison performed at step 1214. This determination may validate the received signature value and/or software change file associated with the received signature value, and may direct process 1200B to step 1218 and/or step 1220.

At step 1218, process 1200B may process software change code, such as software change code received at step 1210. In some embodiments, process 1200B may execute a second version of code on the controller based on the validation performed at step 1216. For example, if process 1200B determined that a received and computed signature value for a second version of code match, it may proceed to execute code to implement the second version of code on a controller.

At step 1220, process 1200B may implement a corrective action, which may be based on a validation performed at step 1216. In some embodiments, a corrective action may be implemented when process 1200B has determined that a received and a computed signature value do not match. A corrective action may include preventing execution of a second version of code (e.g., associated with the received signature value) on a controller, notifying a remote source associated with a second version of code (e.g., remote system 103).

In some embodiments, line-of-code behavior and relation models involved in process 1200A and/or process 1200B may be the same as or similar to line-of-code behavior and relation models from other embodiments. For example, at least one of a line-of-code behavior and relation model constructed at step 1204 or step 1212 may have been generated dynamically based on data associated with real-time operations of a controller. In some embodiments, this data may be limited (e.g., to data from a particular time frame, from a particular set of devices, from a particular set of systems, sampled at a particular rate, etc.) based on a group of parameters they may be set remotely from a device (e.g., remotely from a controller for which a software change file is intended).

Figure 13:
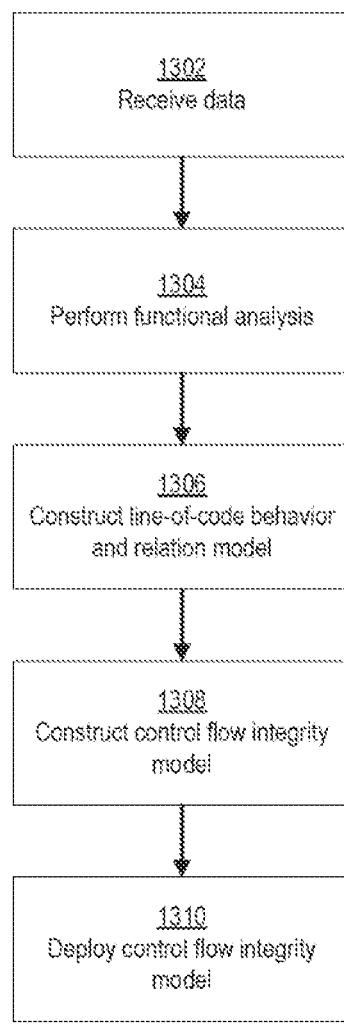
FIG. 13 depicts a flowchart of an exemplary process for analyzing control-flow integrity based on functional line-of-code behavior and relation models, consistent with embodiments of the present disclosure.

FIG. 13 depicts an exemplary process 1300 for analyzing control-flow integrity based on functional line-of-code behavior and relation models. In accordance with above embodiments, process 1300 may be implemented in system 10 depicted in FIG. 1, or any type of IoT network environment. For example, process 1300 may be performed by a processor (e.g., processor 136) and/or other components of security provider 102 (e.g., database 130), or by any computing device or IoT system. In some embodiments, any number of steps of process 1300 may be performed periodically, such as according to a period based on a sensitivity value associated with a controller.

At step 1302, process 1300 may receive data, which may be based on runtime operations of any number of controllers (e.g., the received data may be based on runtime operations of a first controller and a second controller). In some embodiments, such a controller (or controllers) may be associated with a software change. In some embodiments, the data may include multiple datasets associated with different runtime operations. Process 1300 may also apply, as part of step 1302 or another step in the process, a machine learning process to such multiple datasets, which may produce analytical data.

At step 1304, process 1300 may perform a functional analysis, which may be performed on data received at step 1302.

At step 1306, process 1300 may construct a line-of-code behavior and relation model, which may represent execution of functions on a controller, and which may be based on the received data. In some embodiments, constructing a line-of-code behavior and relation model may be based on analytical data (e.g., produced at step 1302). In some embodiments, process 1300 may identify a software change to the controller, and may construct the line-of-code behavior and relation model based on the identified software change. In some embodiments, process 1300 may perform a signature operation on a constructed line-of-code behavior and relation model, which may produce a signature value.

At step 1308, process 1300 may construct a dynamic control flow integrity model, which may be based on the line-of-code behavioral and relation model, and which may be configured for a controller to enforce in real-time.

At step 1310, process 1300 may deploy the dynamic control flow integrity model to a controller (or controllers). Deployment may include compressing the dynamic control flow integrity model, sending the dynamic control flow integrity model to a controller, sending the dynamic control flow integrity model to a system, etc. In some embodiments, a dynamic control flow integrity model may be deployed with a signature value (e.g., a signature value produced at step 1306 may be sent with a dynamic control flow integrity model).

A controller to which the dynamic control flow integrity model is deployed may be configured in various ways, which allow for effective implementation of the dynamic control flow integrity model. For example, a controller may be configured to detect a request to execute code on the controller, and to compare the requested execution to the dynamic control flow integrity model. In addition, such a controller may be configured to take certain actions based on comparing requested execution to a dynamic control flow integrity model. For example, a controller may be configured to deny execution of the code on the controller if the requested execution violates the dynamic control flow integrity model. As another example, a controller may also be configured to generate an alert if the requested execution violates the dynamic control flow integrity model.

In some embodiments, a controller or other device may take actions to validate a dynamic control flow integrity model. For example, a controller may be configured to compare a received signature value (e.g., received as part of a deployment) to a computed signature value, which the controller may be configured to compute. Such computation may be based on the received data of step 1302 and/or data of operations associated with a controller. In some embodiments, a controller may be configured to determine whether to validate the dynamic control flow integrity model, which may be based on the comparison of a received signature value to a computed signature value. For example, if two signature values match, a controller may determine that a received dynamic control flow integrity model is valid, and may operate according to the model. In some embodiments, signature values may be computed for a dynamic control flow integrity model, either instead of or in addition to computing a signature value for a line-of-code behavior and relation model. Signature values computed for a dynamic control flow integrity model may be used in the same way as signature values for a line-of-code behavior and relation model, as is discussed herein.

Figure 14:
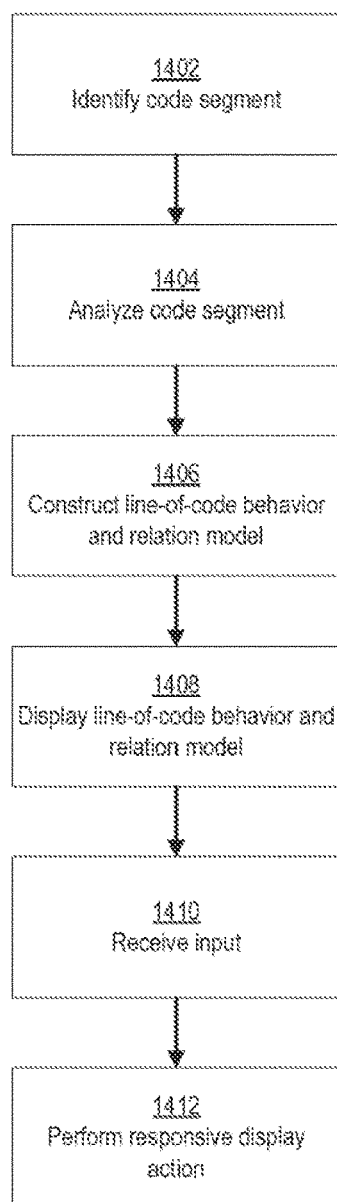
FIG. 14 depicts a flowchart of an exemplary process for visualizing and configuring controller function sequences, consistent with embodiments of the present disclosure.

FIG. 14 depicts an exemplary process 1400 for visualizing and configuring controller function sequences. In accordance with above embodiments, process 1400 may be implemented in system 10 depicted in FIG. 1, or any type of IoT network environment. For example, process 1400 may be performed by a processor (e.g., processor 136) and/or other components of security provider 102 (e.g., database 130), or by any computing device or IoT system. Steps of process 1400 may involve generating information on a display, for example, display 134.

At step 1402, process 1400 may identify at least one code segment, which may be an executable code segment associated with a controller. For example, the at least one code segment may be for implementation or execution on a physical controller (e.g., an ECU, which may be of a vehicle), a virtual controller, a personal computing device, and/or may be code that is not configured to execute. In some embodiments, the code segment may include a code change, which may be represented by a delta file configured to change code on a controller, consistent with other embodiments discussed herein.

At step 1404, process 1400 may analyze at least one code segment (e.g., a code segment identified at step 1402). In some embodiments, analyzing the code segment may involve determining at least one function and/or at least one functional relationship associated with the at least one code segment. Analyzing the code segment may also involve receiving and/or generating a line-of-code behavior and relation model, signature value, dynamic code flow integrity model, or other similar information of the embodiments discussed herein. For example, the code segment may include a delta file configured to change code on a controller from a first version of code to a second version of code.

At step 1406, process 1400 may construct a software functionality line-of-code behavior and relation model, which may visually depict information, such as a determined function and/or functional relationship (e.g., determined at step 1404). In some embodiments, the software functionality line-of-code behavior and relation model may only be accessed by process 1400 (e.g., in embodiments where the model has already been constructed). In some embodiments, a software functionality line-of-code behavior and relation model may be similar to or the same as another model discussed in the present disclosure (e.g., a line-of-code behavior and relation model 30).

At step 1408, process 1400 may display a line-of-code behavior and relation model, which may depict software functionality. The line-of-code behavior and relation model may be displayed at a user interface (e.g., an interface 40, which may e displayed at, for example, display 134).

At step 1410, process 1400 may receive an input, which may be entered at a user interface. For example, an input may be received by a user through an action (e.g., mouse click, touch screen press, keyboard press, etc.) at a user interface, which may be received at a user device 128 or communication interface 132. Such action may be based on an interface 40 displayed to a user. In some embodiments, process 1400 may receive multiple user inputs, either simultaneously or sequentially. For example, process 1400 may receive a second input (e.g., an input associated with a code change on a controller) at a user interface after having received an input at step 1410.

At step 1412, process 1400 may perform a responsive display action, which may be performed in response to the input received at step 1410. In some embodiments, performing a responsive display action may include animating a displayed line-of-code behavior and relation model to visually depict execution of a code segment on a controller, which may include emphasizing a visual element of at least one function associated with at least one code segment. For example, process 1400 may animate a displayed line-of-code behavior and relation model, for example, by animating an update within the model, which may be based on the received second input. Such an animation may include changing a color, text, shading, shape, position, size, a pictorial element (e.g., a red X mark), or any other visual aspect of a displayed visual element, which may correspond to a symbol or symbol relationship, as discussed with respect to other embodiments herein. In some embodiments, a sound may also be played based on a user input (e.g., an alert sound may be played when an update based on a user input is determined to cause an error). As even more specific examples, an animation may include shaking a displayed visual element, enlarging some elements while shrinking others, emboldening the color of some elements while softening the color of other elements, and/or taking any visual manipulation to convey information to a user.

In some embodiments, process 1400 may perform a responsive display action based on information other than a user input. For example, process 1400 may receive data of real-time controller operations, data of historical controller operations, a signature value, symbols, symbol relationships, and/or any other informational sources related to a line-of-code behavior and relation model. In some embodiments, process 1400 may determine expected functional behavior of a controller and actual functional behavior of a controller, which may be based on analysis performed as part of process 1400 or another process discussed herein. A responsive display action may be taken based on such a determination. For example, process 1400 may display (e.g., at a user interface) a visual indicator of functional behavior corresponding to execution of the at least one executable code segment relative to expected functional behavior. As a further example, process 1400 may outline, embolden, animate, or otherwise emphasize displayed symbols or displayed symbol relationships whose actual symbols exhibit functional behavior differing from expected functional behavior. In some embodiments, process 1400 may determine a degree of deviation between expected and actual functional behaviors. Process 1400 may also emphasize (e.g., outline, embolden, animate, etc.) visual elements (e.g., of symbols and/or symbol relationships) with a degree of intensity that correlates with the degree to which the exhibited functional behavior differed from the expected behavior.

Process 1400 may also estimate a probability of downtime for a controller based on the degree of deviation. In some embodiments, process 1400 may display an indication of a probability of downtime (e.g., at a user interface).

In some embodiments, process 1400 may access code, which may be executable code configured to execute a software change on a controller, from which a line-of-code behavior and relation model may be constructed (e.g., at step 1406). In some embodiments, process 1400 may also send an alert to a remote device (e.g., an alert based on a received input, based on a deviation, etc.).

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

For example, while some embodiments are discussed in a context involving electronic controller units (ECUs) and vehicles, these elements need not be present in each embodiment. While vehicle communications systems are discussed in some embodiments, other electronic systems (e.g., IoT systems) having any kind of controllers may also operate within the disclosed embodiments. Such variations are fully within the scope and spirit of the described embodiments.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Moreover, some blocks may be executed iteratively, and some blocks may not be executed at all. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer-readable medium including instructions that, when executed by at least one processor, cause the at least one processor to perform operations for analyzing software delta changes based on functional line-of-code behavior and relation models, comprising:
    identifying a prompt to change a first version of code on a controller to a second version of code;
    constructing, based on the identified prompt, a line-of-code behavior and relation model representing execution of functions of the controller based on functional analysis of the second version of code;
    performing a signature operation on the generated line-of-code behavior and relation model to produce a signature value; and
    sending the signature value to the controller;
    wherein the controller is configured to:
        compare the signature value to a computed signature value based on the second version of code; and
        determine, based on the comparison, whether to validate the second version of code.

2. The non-transitory computer readable medium of claim 1, wherein the functional analysis of the second version of code comprises at least one of a statistical or dynamic analysis process.

3. The non-transitory computer-readable medium of claim 1, wherein the prompt comprises a delta file.

4. The non-transitory computer-readable medium of claim 1, wherein computation of the computed signature value is based on operations associated with the controller.

5. The non-transitory computer-readable medium of claim 1, wherein the controller is further configured to, based on validation of the second version of code, execute the second version of code on the controller.

6. The non-transitory computer-readable medium of claim 1, wherein the controller is further configured to, based on validation of the second version of code, prevent execution of the second version of code on the controller.

7. The non-transitory computer-readable medium of claim 6, wherein the controller is further configured to, based on the validation, notify a remote source associated with the second version of code.

8. The non-transitory computer-readable medium of claim 1, wherein the computed signature value is computed by using the signature operation.

9. The non-transitory computer-readable medium of claim 1, wherein the line-of-code behavior and relation model was generated dynamically based on data associated with real-time operations of the controller.

10. The non-transitory computer-readable medium of claim 9, wherein the data associated with real-time operations of the controller is limited based on parameters set remotely from the controller.

11. The non-transitory computer-readable medium of claim 1, wherein the signature operation is based on an identifier of the controller.

12. The non-transitory computer-readable medium of claim 1, wherein the signature operation is based on at least one of a type, function, version of software, sensitivity value, age, or processing capacity of the controller.

13. A computer-implemented method for analyzing software delta changes based on functional line-of-code behavior and relation models, the method comprising:
- identifying a prompt to change a first version of code on a controller to a second version of code;
- constructing, based on the identified prompt, a line-of-code behavior and relation model representing execution of functions of the controller based on functional analysis of the second version of code;
- performing a signature operation on the generated line-of-code behavior and relation model to produce a signature value; and
- sending the signature value to the controller;
- wherein the controller is configured to:
  - compare the signature value to a computed signature value based on the second version of code; and
  - determine, based on the comparison, whether to validate the second version of code.

14. The computer-implemented method of claim 13, wherein the functional analysis of the second version of code comprises at least one of a statistical or dynamic analysis process.

15. The computer-implemented method of claim 13, wherein the prompt comprises a delta file.

16. The computer-implemented method of claim 13, wherein the controller is further configured to, based on validation of the second version of code, execute the second version of code on the controller.

17. The computer-implemented method of claim 13, wherein the controller is further configured to, based on validation of the second version of code, prevent execution of the second version of code on the controller.

18. The computer-implemented method of claim 13, wherein the computed signature value is computed by using the signature operation.

19. The computer-implemented method of claim 13, wherein the line-of-code behavior and relation model was generated dynamically based on data associated with real-time operations of the controller.

20. The computer-implemented method of claim 13, wherein the signature operation is based on at least one of an identifier, type, function, version of software, sensitivity value, age, or processing capacity of the controller.

* * * * *